US011413807B2

(12) United States Patent
Goodman et al.

(10) Patent No.: US 11,413,807 B2
(45) Date of Patent: Aug. 16, 2022

(54) EXTRUDER HEIGHT TOGGLING

(71) Applicant: MakerBot Industries, LLC, Brooklyn, NY (US)

(72) Inventors: Taylor S. Goodman, New York, NY (US); Christopher James Yarka, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 238 days.

(21) Appl. No.: 16/570,468

(22) Filed: Sep. 13, 2019

(65) Prior Publication Data

US 2020/0086566 A1 Mar. 19, 2020

Related U.S. Application Data

(60) Provisional application No. 62/777,587, filed on Dec. 10, 2018, provisional application No. 62/731,551, filed on Sep. 14, 2018.

(51) Int. Cl.
*B29C 64/118* (2017.01)
*B33Y 30/00* (2015.01)
(Continued)

(52) U.S. Cl.
CPC .......... *B29C 64/118* (2017.08); *B29C 64/209* (2017.08); *B29C 64/232* (2017.08); *B29C 64/236* (2017.08); *B29C 64/245* (2017.08); *B29C 64/295* (2017.08); *B29C 64/321* (2017.08); *B29C 64/35* (2017.08); *B29C 64/379* (2017.08); *B29C 64/393* (2017.08); *B33Y 30/00* (2014.12); *B33Y 40/00* (2014.12);

*B33Y 50/02* (2014.12); *B29C 64/182* (2017.08); *B33Y 10/00* (2014.12)

(58) Field of Classification Search
CPC .................................................. B29C 64/209
See application file for complete search history.

(56) References Cited

U.S. PATENT DOCUMENTS

| 5,764,521 | A  | 6/1998  | Batchelder et al. |
| 7,625,200 | B2 | 12/2009 | Leavitt |

(Continued)

FOREIGN PATENT DOCUMENTS

| CN | 104589649 | 5/2015 |
| CN | 105291436 | 2/2016 |

(Continued)

OTHER PUBLICATIONS

ISA, "International Application Serial No. PCT/US19/51066, International Search Report and Written Opinion dated Feb. 3, 2020", 22 pages.

(Continued)

*Primary Examiner* — Joseph S Del Sole
*Assistant Examiner* — Ariella Machness
(74) *Attorney, Agent, or Firm* — Strategic Patents, P.C.

(57) ABSTRACT

A multi-extruder includes a passive height control mechanism that adjusts the relative height of its extruders without the use of additional, active components. Further, the height control mechanism may employ ramped control surfaces that mitigate noise and vibration by gradually transferring vertical loads while transferring from one active extruder to another.

21 Claims, 9 Drawing Sheets

(51) Int. Cl.
    *B33Y 40/00*        (2020.01)
    *B29C 64/232*     (2017.01)
    *B29C 64/209*     (2017.01)
    *B29C 64/321*     (2017.01)
    *B29C 64/236*     (2017.01)
    *B33Y 10/00*       (2015.01)
    *B29C 64/182*     (2017.01)
    *B29C 64/379*     (2017.01)
    *B29C 64/245*     (2017.01)
    *B29C 64/35*       (2017.01)
    *B29C 64/295*     (2017.01)
    *B29C 64/393*     (2017.01)
    *B33Y 50/02*       (2015.01)

(56) References Cited

U.S. PATENT DOCUMENTS

| | | | |
|---|---|---|---|
| 8,663,533 | B2 | 3/2014 | Swanson et al. |
| 9,233,506 | B2 | 1/2016 | Leavitt |
| 9,744,730 | B2 | 8/2017 | Comb |
| 10,124,539 | B2 | 11/2018 | Batchelder et al. |
| 2007/0228590 | A1* | 10/2007 | LaBossiere ............ B33Y 30/00 264/40.1 |
| 2010/0166969 | A1 | 7/2010 | Batchelder |
| 2014/0159284 | A1 | 6/2014 | Leavitt |
| 2014/0363532 | A1 | 12/2014 | Wolfgram |
| 2016/0263830 | A1 | 9/2016 | Batchelder et al. |
| 2019/0322047 | A1 | 10/2019 | Riha et al. |
| 2020/0079014 | A1 | 3/2020 | Migliori et al. |
| 2020/0086552 | A1 | 3/2020 | Yarka |
| 2020/0086569 | A1 | 3/2020 | MacNeil et al. |
| 2020/0086577 | A1 | 3/2020 | Pappas et al. |
| 2020/0130277 | A1 | 4/2020 | Thorpe et al. |

FOREIGN PATENT DOCUMENTS

| | | | | |
|---|---|---|---|---|
| WO | WO-2018122390 | A1 * | 7/2018 | ............ B33Y 40/00 |
| WO | WO-2020056300 | | 3/2020 | |

OTHER PUBLICATIONS

ISA, "International Application Serial No. PCT/US19/51066, Invitation to Pay Fees and Partial Search Report dated Dec. 12, 2019", 16 pages.

Stratasys, "Tip Shield", Stratasys Technical Disclosure 09-001, 1 Page.

Hannfin, Parker, "Coefficient of Thermal Expansion", https://promo.parker.com/promotionsite/oring-ehandbook/us/en/ehome/Coefficient-of-Thermal-Expansion Sep. 7, 2015, 2 pages.

Wright, John E., "Tip Shields", uPrint SE & uPrint SE Plus, https://www.youtube.com/watch?v=y4aXvAWDXkQ Apr. 9, 2014, 1 page.

"Engineering Tool Box, Coefficients of Linear Thermal Expansion", [online] Available at: https://www.engineeringtoolbox.com/linear-expansion-coefficients-d_95.html 2003, 10 pages.

"Engineering ToolBox,Thermal Conductivity of some selected Materials and Gases", [online] Available at: https://www.engineeringtoolbox.com/thermal-conductivity-d_429.html 2003, 13 pages.

"Thermo Fisher Scientific, Material Safety Data Sheet Poly(tetrafluoroethylene)", Jan. 19, 2018, 6 pages.

"RGP Balls, Viton Rubber Balls", https://www.rgpballs.com/en/viton-rubber-balls/ Feb. 7, 2013, 2 pages.

"U.S. Appl. No. 16/570,435 Non-Final Office Action dated Feb. 23, 2021",, 35 pages.

WIPO, "Application No. PCT/US19/51066 International Preliminary Report on Patentability dated Mar. 26, 2021", 15 pages.

* cited by examiner

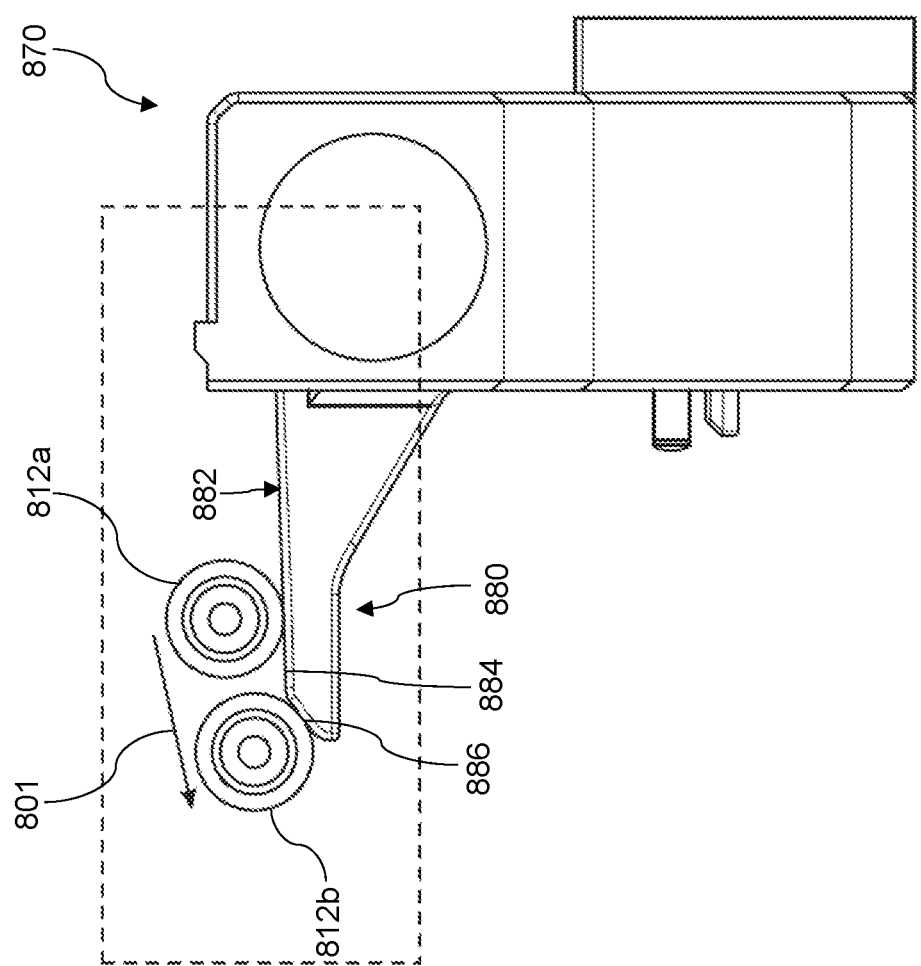

EXTRUDER HEIGHT TOGGLING

CROSS-REFERENCE TO RELATED APPLICATIONS

This application claims priority to U.S. Provisional Application No. 62/731,551 filed on Sep. 14, 2018 and U.S. Provisional Application No. 62/777,587 filed on Dec. 10, 2018, where the entire contents of each of the foregoing applications are hereby incorporated by reference.

FIELD

The present disclosure relates generally to three-dimensional printing, and more specifically to a toggling height control system for a multi-extruder assembly.

BACKGROUND

Multi-extruder assemblies typically employ some type of height control mechanism so that an inactive extruder can be raised (or an active extruder lowered, or both) to avoid disturbing a layer of material deposited by its active extruder counterpart. However, switching between different extruders in this context can be cumbersome, and may require additional hardware, control complexities, and so forth. Moreover, the physical height adjustment can generate significant noise and vibrations that may damage printer components or create unwanted background noise during a print. There remains a need for a multi-extruder printer with improved height control.

SUMMARY

A multi-extruder includes a passive height control mechanism that adjusts the relative height of its extruders without the use of additional, active components. Further, the height control mechanism may employ ramped control surfaces that mitigate noise and vibration by gradually transferring vertical loads while transferring from one active extruder to another.

In one aspect, an extruder assembly disclosed herein includes a first extruder including a first follower, the first extruder defining a first extrusion path, and at least one portion of the first extrusion path defining a z-axis. The extruder assembly also includes a cam having a working surface movable relative to the first extruder and shaped to translate a first movement of the cam along an x-axis or a y-axis into a second movement of the first follower along the z-axis, the first follower movable along the working surface of the cam as the working surface moves relative to the first extruder to raise the first follower along the z-axis. The extruder assembly also includes a support engageable with the cam to reverse the first movement of the cam and lower the working surface adjacent to the first follower along the z-axis, and a damper coupled to the support, the damper engageable with the first extruder to receive a z-axis load from the first extruder and decouple the first follower from the working surface of the cam as the support lowers the working surface of the cam adjacent to the first follower.

Implementations may include one or more of the following features. The working surface of the cam may be movable relative to the first extruder in response to a force associated with engagement of the support with the cam. The first extruder may include a second follower movable along the damper, and the z-axis load from the first extruder may be receivable by the damper via the second follower. The damper may include a contact surface for the second follower, the contact surface shaped to smoothly lower the first extruder into a working position along the z-axis as the first extruder moves away from the support along the x-axis or y-axis. The first follower may be movable along the working surface of the cam in rolling contact with the working surface of the cam, and the second follower may be movable along the damper in rolling contact with the support. The first follower and the second follower may be spaced apart from one another at least along the z-axis. The extruder assembly may further include a gantry and a carriage, where the gantry has a guide surface defining an axis perpendicular to the z-axis, the first extruder is supported on the carriage, and the carriage is movable along the guide surface of the gantry in at least one direction along the axis perpendicular to the z-axis. At least one of the damper or the support may be in a fixed location along the axis perpendicular to the z-axis. The extruder assembly may further include a second extruder supported on the carriage, where the second extruder defines a second extrusion path, and movement of the first follower along the working surface of the cam changes a z-axis position of the first extruder. The working surface of the cam may be movable relative to the first extruder along the axis perpendicular to the z-axis. The damper may include an arm cantilevered from the support along the axis perpendicular to the z-axis. The cam may be a linear cam, and the working surface of the cam may have a first two-dimensional profile in a plane defined by the z-axis and the axis perpendicular to the z-axis. The arm may have a second two-dimensional profile in the plane defined by the z-axis and the axis perpendicular to the z-axis, the first extruder may include a second follower, and the arm may be engageable with the second follower to move the second follower along the second two-dimensional profile of the arm as the z-axis load of the first extruder is supported on the arm. The first two-dimensional profile of the working surface of the cam may be different from the second two-dimensional profile of the arm.

In one aspect, a three-dimensional printer disclosed herein includes a build plate having a substantially planar surface, and a plurality of extruders, each of the plurality of extruders defining a respective extrusion orifice directed toward the build plate, and each extrusion orifice supported above the build plate at a respective height along a z-axis perpendicular to the substantially planar surface. The three-dimensional printer also includes a cam having a working surface engageable with a first extruder of the plurality of extruders, the working surface of the cam moveable relative to the first extruder to change a z-axis position of the first extruder relative to at least one other one of the plurality of extruders. The three-dimensional printer also includes a support engageable with the cam to move the cam in a manner that lowers the working surface supporting the first extruder, and a damper coupled to the support, the damper engageable with the first extruder to receive a z-axis load from the extruder thereby decoupling the first extruder from the cam as the contact with the support lowers the working surface.

Implementations may include one or more of the following features. The plurality of extruders and the cam may be movable together in a first direction parallel to the substantially planar surface of the build plate, the support may be selectively engageable with the cam to move the cam relative to the plurality of extruders in a second direction, opposite the first direction, and a movement of the cam relative to the first extruder in the second direction may decouple the first extruder from the cam. The damper may include an arm cantilevered from the support in a direction parallel to the substantially planar surface of the build plate. The arm may include an inclined surface extending obliquely to the substantially planar surface, the inclined surface positioned to make an initial contact with the first extruder as the damper engages the first extruder, where the z-axis load of the first extruder is received by the arm as the first extruder moves toward the support and away from the build plate along the inclined surface. The inclined surface may include a first surface angled to receive a load from the first extruder as the plurality of extruders move toward the support and a second surface angled to smoothly and continuously lower the first extruder into a working position as the plurality of extruders move away from the support.

In one aspect, a method disclosed herein includes moving a plurality of extruders within a plane parallel to a substantially planar surface of a build plate, each of the plurality of extruders defining a respective extrusion orifice supported above the build plate at a respective height above the substantially planar surface; moving a working surface of a cam relative to a first extruder of the plurality of extruders, movement of the working surface changing a z-axis position of the first extruder relative to the build plate; and engaging a damper with the first extruder to receive a z-axis load from the first extruder. The plurality of extruders and the cam may move together in a first direction, where the method further includes engaging a support with the cam to move the cam in a second direction, opposite the first direction, to provide movement of the working surface.

In one aspect, an extruder assembly disclosed herein includes a first extruder defining a first extrusion path, at least one portion of the first extrusion path defining a z-axis, the first extruder including a working surface shaped to translate a horizontal movement along the working surface into a vertical movement of the first extruder. The extruder assembly also includes a cam having a first follower horizontally movable relative to the first extruder and positioned to travel along the working surface, the first follower movable along the working surface of the first extruder as the first follower moves in a first direction relative to the first extruder to lower the working surface along the z-axis. The extruder assembly also includes a support engageable with the cam to move the cam in a second direction opposing the first direction to raise the working surface along the z-axis, and a damper engageable with the first extruder to receive a z-axis load from the first extruder and to decouple the first follower from the working surface as the support lowers the working surface beneath first follower in response to a movement in the first direction.

In another aspect, an extruder assembly disclosed herein includes a first extruder, a second extruder movably coupled to the first extruder to permit vertical movement of the second extruder relative to the first extruder, and a coupler structurally configured to mechanically control a z-axis position of the second extruder relative to the first extruder, the coupler including a horizontal slider structurally configured to cause upward movement of the second extruder in response to a first horizontal movement in a first direction and to permit downward movement of the second extruder in response to a second horizontal movement in a second direction opposing the first direction.

Implementations may include one or more of the following features. The coupler may extend horizontally from the extruder assembly to expose a first end and a second end that provide control surfaces to move the coupler horizontally in the first direction and the second direction respectively. The extruder assembly may further include a support in a predetermined position within a three-dimensional printer, the support including a first surface and a second surface, the first surface shaped to receive and vertically support the second extruder as the extruder assembly horizontally contacts the support, and the second surface shaped to concurrently move the coupler in the second direction as the extruder assembly horizontally contacts the support. The coupler or the second extruder may include a working surface with a ramp shaped to gradually raise and lower the second extruder between an active position with an exit orifice below a lowest point of the first extruder and an inactive position with the exit orifice above the lowest point of the first extruder. The working surface may include a plateau above the ramp to support the second extruder in the inactive position and a ridge, the ridge having a height greater than the plateau and the ridge positioned between the plateau and the ramp to bi-stably retain the second extruder in the inactive position when the extruder assembly is not engaged with the damper.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

FIG. 8 shows a detail of a support engaged with a follower.

DESCRIPTION

Figure 1:
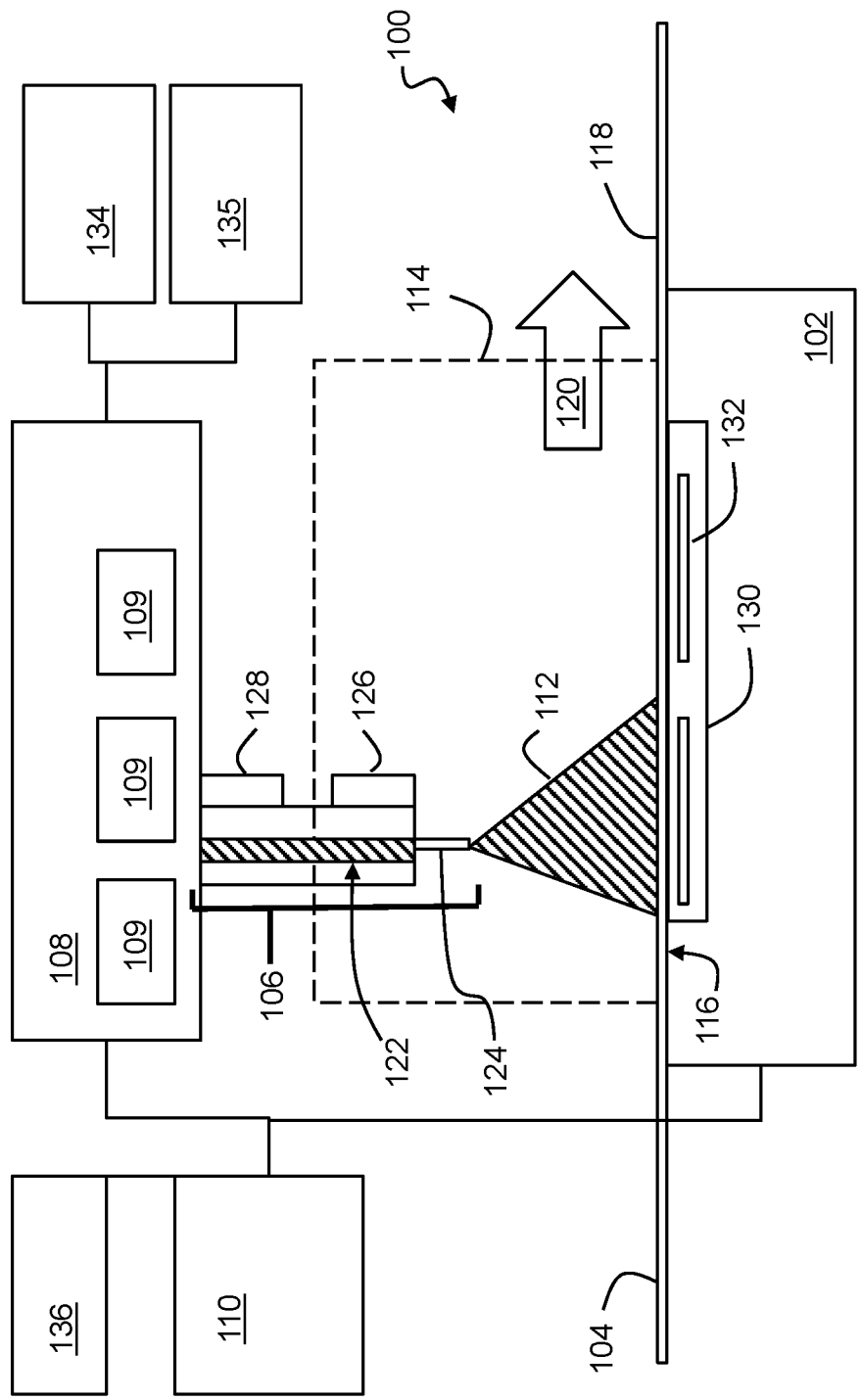
FIG. 1 is a block diagram of a three-dimensional printer.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Described herein are devices, systems, and methods for improvements in three-dimensional printing, such as improvements related to extruders and extrusion techniques.

The following description emphasizes three-dimensional printers using fused deposition modeling or similar techniques where a bead of material is extruded in a layered series of two dimensional patterns as "roads" or "paths" to form a three-dimensional object from a digital model. It will be understood, however, that numerous additive fabrication techniques are known in the art including, without limitation, multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer," "three-dimensional printer," "fabrication system," and so forth, unless a more specific meaning is explicitly provided or otherwise clear from the context.

FIG. 1 is a block diagram of a three-dimensional printer. In general, a printer 100 may include a build platform 102 (which may otherwise be referred to herein as a "build plate"), a conveyor 104, an extruder 106, an x-y-z positioning assembly 108, and a controller 110 that cooperate with one another to fabricate an object 112 within a working volume 114 of the printer 100.

The build platform 102 may include a surface 116 that is rigid and substantially planar. The surface 116 may support the conveyer 104 to provide a fixed, dimensionally and positionally stable platform on which to build the object 112.

The build platform 102 may include a thermal element 130 that controls the temperature of the build platform 102 through one or more active devices 132 such as thermoelectric heating and/or cooling devices (e.g., resistive elements that convert electrical current into heat, Peltier effect devices that can create a heating or cooling affect, and combinations thereof). Accordingly, the thermal element 130 may be a heater that provides active heating to the build platform 102, a cooling element that provides active cooling to the build platform 102, or a combination of these. The heater 130 may be coupled in a communicating relationship with the controller 110 for the controller 110 to controllably impart heat to or remove heat from the surface 116 of the build platform 102. Thus, for example, the thermal element 130 may include an active cooling element positioned within or adjacent to the build platform 102 to controllably cool the build platform 102.

It will be understood that a variety of other techniques may additionally, or alternatively, be employed to control a temperature of the build platform 102. For example, the build platform 102 may use a gas cooling or gas heating device such as a vacuum chamber in an interior thereof, which may be quickly pressurized to heat the build platform 102 or vacated to cool the build platform 102 as desired. As another non-exclusive example, a stream of heated or cooled gas may be applied directly to the build platform 102 before, during, and/or after a build process.

The conveyer 104 may include a sheet 118 of material that moves in a path 120 through the working volume 114. Within the working volume 114, the path 120 may pass proximal to the surface 116 of the build platform 102—that is, resting directly on or otherwise supported by the surface 116—to provide a rigid, positionally stable working surface for a build. It will be understood that, while the path 120 is depicted as a unidirectional arrow, the path 120 may be bidirectional, such that the conveyer 104 can move, for example, in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor 104 may, additionally or alternatively, include a motor or other similar drive mechanism (not shown) coupled to the controller 110 to control movement of the sheet 118 of material along the path 120. Various drive mechanisms are described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to about seven thousandths of an inch, or any other thickness that permits the sheet 118 to follow the path 120 of the conveyer 104. For example, with sufficiently strong material, the sheet 118 may have a thickness of about one to about three thousandths of an inch. The sheet 118 may further, or instead, include sections of rigid material joined by flexible links.

A working surface of the sheet 118 (e.g., an area on the top surface of the sheet 118 within the working volume 114) may be treated to assist with adhesion of build material to the surface 118 and/or to facilitate removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to facilitate build processes as described herein. For example, the chemical treatment may include deposition of material that can be chemically removed from the conveyer 104 by use of water, solvents, or the like. This may facilitate separation of a completed object from the conveyer by dissolving the layer of chemical treatment between the object 112 and the conveyor 104. The chemical treatments may include deposition of a material that easily separates from the conveyer such as a wax, mild adhesive, or the like. The chemical treatment may include a detachable surface such as an adhesive that is sprayed onto the conveyer 104 prior to fabrication of the object 112.

In one aspect, the conveyer 104 may include a sheet of disposable, one-use material fed from a dispenser and consumed with each successive build.

In one aspect, the conveyer 104 may include a number of different working areas with different surface treatments adapted for different build materials or processes. For example, different areas may have different textures (e.g., smooth, abraded, grooved, etc.). Additionally, or alternatively, different areas may be formed of different materials. Further, or instead, different areas may have or receive different chemical treatments. Thus, it should be appreciated that a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 defining an exit port with a circular, oval, slotted or other cross-sectional profile that extrudes build material in a desired cross-sectional shape.

The extruder 106 may include a heater 126 to melt build materials (e.g., thermoplastic material) within the chamber 122 for extrusion through the extrusion tip 124 in melted form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heaters suitable for creating heat within the chamber 122 to melt the build material for extrusion. The extruder 106 may also, or instead, include a motor 128 to push the build material into the chamber 122, through the extrusion tip 124, or a combination thereof.

In general operation (and by way of example rather than limitation), a build material, such as ABS plastic in filament form, may be fed into the chamber 122 from a spool by the motor 128, melted by the heater 126, and extruded from the extrusion tip 124. By controlling process parameters (e.g., one or more of a rate of the motor 128 and the temperature of the heater 126) the build material may be extruded at a controlled volumetric rate. It will be understood that a variety of techniques may be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 108 may generally be movable to three-dimensionally position the extruder 106 and the extrusion tip 124 within the working volume 114. Thus, for example, by controlling the volumetric rate of delivery for the build material and the x, y, z position of the extrusion tip 124, the object 112 may be fabricated in three dimensions by depositing successive layers of material in two-dimensional patterns derived (e.g., two-dimensional patterns derived from cross-sections of a computer model or other computerized representation of the object 112). The x-y-z positioning assembly 108 may, for example, include a number of stepper motors 109 to control independently a position of the extruder within the working volume along each of an x-axis, a y-axis, and a z-axis. More generally, the x-y-z positioning assembly 108 may include, without limitation, various combinations of stepper motors, encoded DC motors, gears, belts, pulleys, worm gears, threads, and the like. Any such arrangement suitable for controllably positioning the extruder 106 within the working volume 114 may be adapted to use with the printer 100 described herein.

By way of example and not limitation, the conveyer 104 may be affixed to a bed that provides x-y positioning within the plane of the conveyor 104, while the extruder 106 can be independently moved along a z-axis. Additionally, or alternatively, the conveyor 104 may be x, y, and z positionable, and the extruder 106 may be, optionally, stationary. Further, or instead, the extruder 106 may be x, y, and z positionable while the conveyer 104 remains fixed (relative to the working volume 114). In yet another example, the conveyer 104 may, by movement of the sheet 118 of material, control movement in one axis (e.g., the y-axis), while the extruder 106 moves in the z-axis as well as one axis in the plane of the sheet 118. Thus, in certain instances, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system may serve as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including, without limitation, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through a network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor embedded within or attached below the surface of the build platform 102. This may also or instead include an infrared detector directed at the surface 116 of the build platform 102 or the sheet 118 of material of the conveyer 104. Other sensors that may be usefully incorporated into the printer 100 as the sensor 134 include, without limitation, a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used, for example, to ensure that the object 112 is removed from the conveyer 104 prior to beginning a new build at that location on the working surface (e.g., the surface 116 of the build platform 102). Thus, the sensor 134 may be used to determine whether an object is present that should not be, or to detect when an object is absent, or a combination thereof. The feedback from this sensor 134 may be used by the controller 110 to issue processing interrupts or otherwise control operation of the printer 100.

The sensor 134 may include a sensor that detects a position of the conveyer 104 along the path. This information may be obtained, for example, from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (e.g., a radiant heater or forced hot air) to heat the working volume 114 to maintain the object 112 at a fixed, elevated temperature throughout a build. The sensor 134 may also, or instead, include a cooling element to maintain the object 112 at a predetermined sub-ambient temperature throughout a build. It should be appreciated that a heater included in the sensor 134 may be instead of, or in addition to, the thermal element 130.

The sensor 134 may also or instead include at least one video camera. The video camera may generally capture images of the working volume 114, the object 112, or any other hardware associated with the printer 100. The video camera may provide a remote video feed through the network interface 136. In such instances, the feed may be available to remote users through a user interface maintained, for example, by remote hardware, or, further or instead, the feed may be available within a web page provided by a web server hosted by the three-dimensional printer 100. Thus, in certain implementations, there is a user interface adapted to present a video feed from at least one video camera of a three-dimensional printer to a remote user through a user interface.

The sensor 134 may also or instead include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In some instances, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including, without limitation, pass/fail decisions, error detection (and corresponding audible or visual alerts), shape detection, position detection, orientation detection, collision avoidance, and combinations thereof.

The printer 100 may include other hardware 135, which may be, for example, input devices including any one or more of the following: a keyboard, a touchpad, a mouse, switches, dials, buttons, and motion sensors. Additionally, or alternatively, the other hardware 135 may be, for example, output devices including any one or more of the following: a display, a speaker or other audio transducer, and light emitting diodes. Other hardware 135 may also or instead include a variety of cable connections and/or hardware adapters for connecting, for example, to external computers, external hardware, external instrumentation data acquisition systems, and combinations thereof.

The printer 100 may include, or be connected in a communicating relationship with, the network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long-range wireless networking components. This may include hardware for short range data communications such as Bluetooth or an infrared transceiver, which may be used to couple into a local area network that is, in turn, coupled to a data network such as the Internet. This may also, or instead, include hardware/software for a WiMAX connection or a cellular network connection (using, e.g., CDMA, GSM, LTE, or any other suitable protocol or combination of protocols). The controller 110 may be configured to control participation by the printer 100 in any network to which the network interface 136 is connected, such as by autonomously connecting to the network to retrieve printable content, or responding to a remote request for status or availability.

Specific improvements to three-dimensional printing, e.g., using a three-dimensional printer as described above with reference to FIG. 1, will now be discussed. One such improvement may include a system for changing the z-axis position of one or more extruders in a multi-extruder assembly, and another such improvement may include mechanical damping that mitigates noise and vibration by gradually transferring a vertical load while a movable extruder is being lowered into a position for printing. In this manner, the present teachings may generally include a cam that acts as a "toggle" for an extruder assembly featuring multiple extruders. Specifically, an extruder assembly may include a two-sided toggle (e.g., for two extruders) as well as damping for noise and vibration that can be created by such a two-sided toggle.

Figure 3:
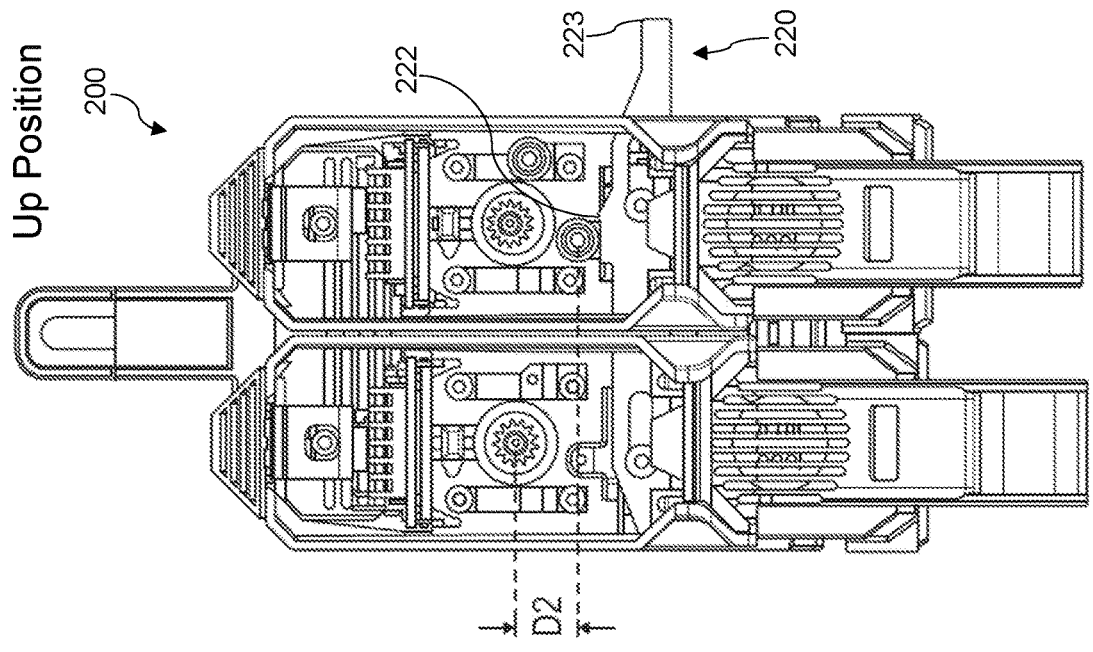
FIG. 3 shows an extruder assembly with a first extruder in an 'up' position.
Figure 2:
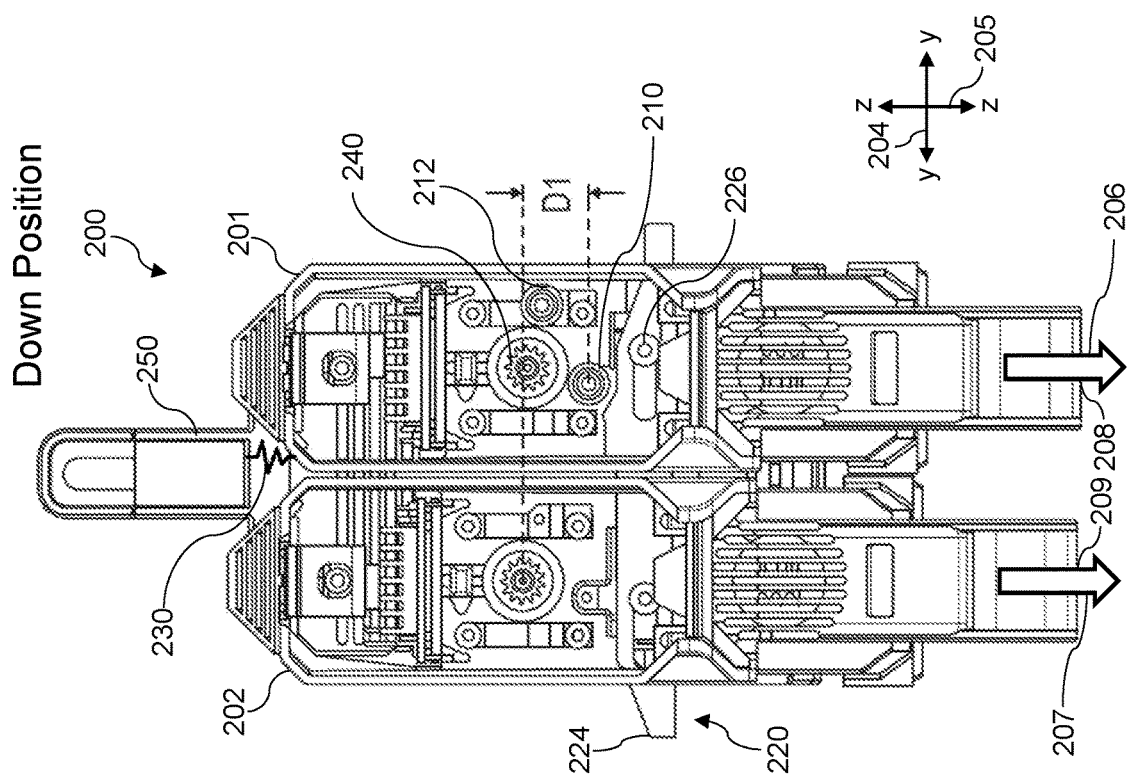
FIG. 2 shows an extruder assembly with a first extruder in a 'down' position.

FIG. 2 shows an extruder assembly with a first extruder in a 'down' position, and FIG. 3 shows the extruder assembly with the first extruder in an 'up' position. The extruder assembly 200 may include a plurality of extruders—e.g., a first extruder 201 and a second extruder 202—where any of these individual extruders may include any of the features of the extruder 106 of FIG. 1 described above. In other words, unless otherwise specified or made clear from the context, the extruder assembly 200 should be understood to be interchangeable with the extruder 106 discussed above with respect to FIG. 1.

In general, a three-dimensional printer having a build volume with an x-axis (which would be traversing into and out of the page in FIGS. 1 and 2), a y-axis 204, and a z-axis 205 may feature an extruder assembly 200 including a plurality of extruders. It will be understood that, unless explicitly stated to the contrary or otherwise clear from the context, when referring to movement of the extruder assembly 200 or its components along the y-axis 204, this could also or instead include movement along the x-axis. That is, in general, the present teachings may include an extruder assembly 200 that moves along one or more of the x-axis and y-axis 204 to move one of the extruders along a z-axis 205.

Figure 7:
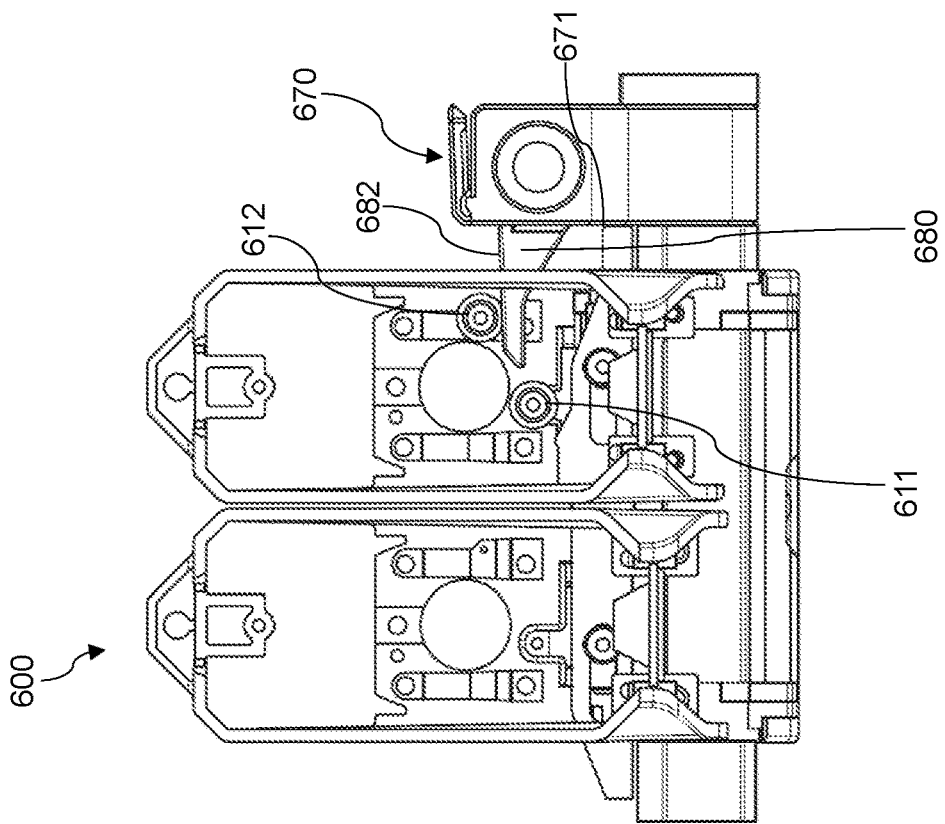
FIG. 7 shows a support engaged with a follower.
Figure 6:
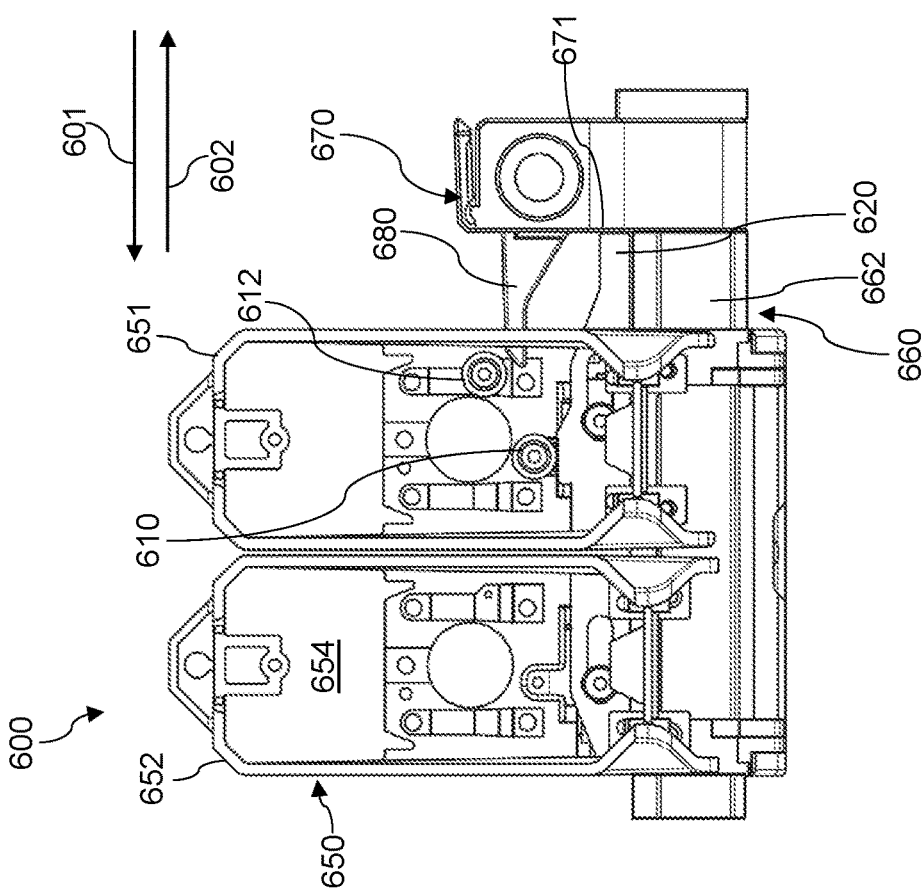
FIG. 6 shows an extruder assembly including a support.

The extruder assembly 200 (or, more generally, a three-dimensional printer) may include a multi-extruder including a first extruder 201 and a second extruder 202, a plurality of followers (e.g., a first follower 210 and a second follower 212), a cam 220, a support, and a damper coupled to the support (although not shown in FIGS. 2 and 3, the support 670 and the damper 680 are shown in, e.g., FIGS. 6 and 7).

Turning back to FIGS. 2 and 3, one or more of the first extruder 201 and the second extruder 202 may be movable along the z-axis 205 relative to a gantry or a carriage 250 that holds the extruder assembly 200 (e.g., where the carriage 250 is movable via an x-y-z positioning assembly such as that described above). For example, each of the first extruder 201 and the second extruder 202 may be movable, or one of these extruders may be fixed while the other is movable. By way of example, in an implementation, the first extruder 201 is movably coupled to the three-dimensional printer to permit a change of position of the first extruder 201 in a direction of the z-axis 205 independent from the second extruder 202, while the second extruder 202 remains in a fixed z-axis position. In this manner, one or more of the extruders may be independently movable along the z-axis 205 relative to the other(s), or the extruders may cooperate with one another when moving along the z-axis 205.

The first extruder 201 may define a first extrusion path 206 through a first extrusion orifice 208 of the first extruder 201, where at least one portion of the first extrusion path 206 is disposed along the z-axis 205. Similarly, the second extruder 202 may define a second extrusion path 207 through a second extrusion orifice 209 of the second extruder 202, where at least one portion of the second extrusion path 207 is disposed along the z-axis 205.

The first extruder 201 may include, or otherwise be coupled to, one or more followers—e.g., a first follower 210 and a second follower 212. The followers may include a bearing, a wheel, or the like, where the followers can freely rotate about an axis (e.g., an axis aligned along the x-axis), but where the axis of the followers is fixed relative to the first extruder 201. In general, the followers may include a load bearing surface oriented to permit relatively low-friction movement along the x-axis or the y-axis 604. That is, the followers may be structurally configured to rotate and follow along a surface, such as a working surface 222 of the cam 220.

The position of each of the first follower 210 and the second follower 212 relative to the first extruder 201 may be fixed. That is, because the followers may include a bearing or a wheel, the followers may be capable of rotating, while other movement relative to the extruders is mechanically discouraged or prevented. In this manner, if one or more of the first follower 210 and the second follower 212 are moved (e.g., along the z-axis 205), then the first extruder 201 (or a portion of the carriage 250 holding the first extruder 201) may similarly be moved. More succinctly, in certain implementations, if the followers experience at least a predetermined force along the z-axis 205, both the followers and the first extruder 201 will move along the z-axis 205.

Thus, the first follower 210 may be structurally configured to adjust the z-axis position of the first extruder 201. That is, when the first follower 210 is raised (e.g., by the working surface 222 of the cam 220), the first extruder 201 may be similarly raised, and vice-versa.

In general, the second follower 212 may be structurally configured to dampen a lowering of the first extruder 201 from a non-printing height to a printing height along the z-axis 205. That is, because of the materials used (e.g., metals) and the weight of the extruders, lowering the first extruder 201 from a non-printing height to a printing height along the z-axis 205 may result in unwanted noise or vibration. To mitigate this, the second follower 212 may be positioned and structurally configured to move along another surface (e.g., the surface of a damper), which may be ramped or otherwise shaped to bear at least a portion of the z-axis load of the first extruder 201 and to gradually transfer this load to a different z-axis position when transitioning from the non-printing height to the printing height along the z-axis 205 or when otherwise decoupling the first follower 210 from the working surface 222 of the cam 220.

The cam 220 may include an elongate member that extends through one or more of the first extruder 201 and the second extruder 202 (e.g., the cam 220 may extend through each of the extruders in an extruder assembly 200). Also, or instead, the cam 220 may extend through and be coupled with the carriage 250 that holds one or more of the first extruder 201 and the second extruder 202. The cam 220 may be movable (e.g., slidable) relative to one or more of the first extruder 201 and the second extruder 202. That is, the cam 220 may have a working surface 222 movable relative to the first extruder 201, for example, where the working surface 222 is the top surface of an elongate body that forms the cam 220. The working surface 222 may be shaped to translate a first movement of the cam 220 along one or more of the x-axis or the y-axis 205 into a second movement of the first follower 210 along the z-axis 205. In this manner, the first follower 210 may be movable along the working surface 222 of the cam 220 as the working surface 222 moves relative to the first extruder 201 to raise the first follower 210 along the z-axis 205. And because the axis of the first follower 210 may be fixed relative to the first extruder 201, movement of the first follower 210 along the z-axis 205 may similarly move the first extruder 201 along the z-axis 205.

The cam 220 may therefore act as a toggle for the extruder assembly 200, with the ability to adjust a z-axis height of one or more extruders of the extruder assembly—e.g., between a printing height for depositing build material in a three-dimensional print and a non-printing height when an extruder is not depositing build material in a three-dimensional print. The working surface 222 of the cam 220 may be shaped to lift the first extruder 201 (or the second extruder 202) along the z-axis 205 via the first follower 210 when the cam 220 moves in a first direction along the y-axis 204 (or another axis intersecting the z-axis 205).

As stated above, the cam 220 may extend through each of the first extruder 201 and the second extruder 202 such that each of a first end 223 and a second end 224 of the cam 220 is exposed external to the multi-extruder extruder assembly 200. In this manner, either of the first end 223 and the second end 224 of the cam 220 may be contacted from outside the multi-extruder assembly 200 to move the cam 220 vertically in either direction relative to the multi-extruder assembly 200. In certain implementations, the cam 220 is in communication with a slider 226 or the like (e.g., one or more bearings) that facilitates sliding movement of the cam 220 relative to the extruders of the extruder assembly 200.

In certain implementations, a biasing member 230 such as a spring may be coupled to one or more of the first extruder 201 and the second extruder 202, or a component engaged thereto. The biasing member 230 may be structurally configured to bias one or more of the first extruder 201 and the second extruder 202 toward either a printing height or a non-printing height along the z-axis 205, e.g., in the absence of other forces such as the force of the working surface 222 of the cam 220 against the first follower 210. This may, for example, mitigate rattling of individual extruders as the multi-extruder assembly 200 is moved about within a build volume during use.

The extruder assembly 200 may further include one or more drive wheels 240. In certain implementations, a single drive wheel 240 may be shared by each of the first extruder 201 and the second extruder 202 for driving a build material (e.g., a filament) therethrough. To this end, a displacement of the drive wheel 240 (e.g., along the z-axis 205) may alternately disengage or engage with one of the first extruder 201 and the second extruder 202. In another aspect, the drive wheel 240 may be clutched or otherwise mechanically configured to that a clockwise rotation of the drive wheel 240 advances one extruder while a counterclockwise rotation of the drive wheel 240 advances the other. In other implementations, such as that shown in FIGS. 2 and 3, each extruder may include its own drive wheel 240.

As discussed above, the cam 220 may work in conjunction with the first follower 210 for moving a z-axis position of the first extruder 201. For example, and as discussed above, FIG. 2 shows an extruder assembly 200 with the first extruder 201 in a down position, and FIG. 3 shows the extruder assembly 200 with the first extruder 201 in an up position, where the down position is a printing position and the up position is a non-printing position. That is, when the first extruder 201 is in the down position, it may be positioned for depositing build material in a three-dimensional printing operation while the second extruder 202 is in the up position (relative to the first extruder 20—as noted, the second extruder 202 may remain stationary along the z-axis 205 while the first extruder 201 moves up and down) while inactive, e.g., while not depositing build material in the three-dimensional printing operation; and when the first extruder 201 is in the up or inactive position, the second extruder 202 may be in an active position relative to the first extruder 201 for depositing build material in the three-dimensional printing operation. In certain implementations, only one of the extruders is capable of moving between the up position and the down position, while another extruder remains fixed at a predetermined z-axis height relative to the carriage 250. In other implementations, each of the extruders in the extruder assembly 200 is capable of moving between the up position and the down position. For example, when one extruder moves (e.g., from the up position to the down position), the other extruder may automatically move in the opposite direction along the z-axis 205 (e.g., from the down position to the up position), e.g. by coupling the two extruders through a pivot that enforces alternate z-axis movement, or otherwise controlling or interconnecting the two extruders for opposing vertical motion.

It will be understood that the difference between the down position and the up position may be relatively small. For example, in certain implementations, the difference in the z-axis height between the up position and the down position for the end of the extruder that deposits build material is between about 1-2 mm (e.g., about 1.4 mm), or enough vertical displacement to avoid interference between a lowest point of the inactive extruder and a highest point of build material deposited by the active extruder. FIGS. 2 and 3 demonstrate this z-axis height difference by showing the difference in z-axis height between the axles of the first follower 210 in the first extruder 201 and the drive wheel 240 of the second extruder 202. That is, the distance D1 in FIG. 2 shows the difference in z-axis height between the axles of the first follower 210 in the first extruder 201 when the first extruder 201 is in the down position; and distance D2 in FIG. 3 shows the difference in z-axis height between the axles of the first follower 210 in the first extruder 201 when the first extruder 201 is in the up position. Specifically, D1 may be larger than D2, demonstrating that the z-axis position of the first extruder 201 is located further away from the drive wheel 240 of the second extruder 202 (which may have a fixed z-axis position relative to the carriage 250) in the down position. In certain implementations, D1 is about 12.600 mm and D2 is about 11.194 mm. However, other distances are also or instead possible for D1 and D2.

Figure 4:
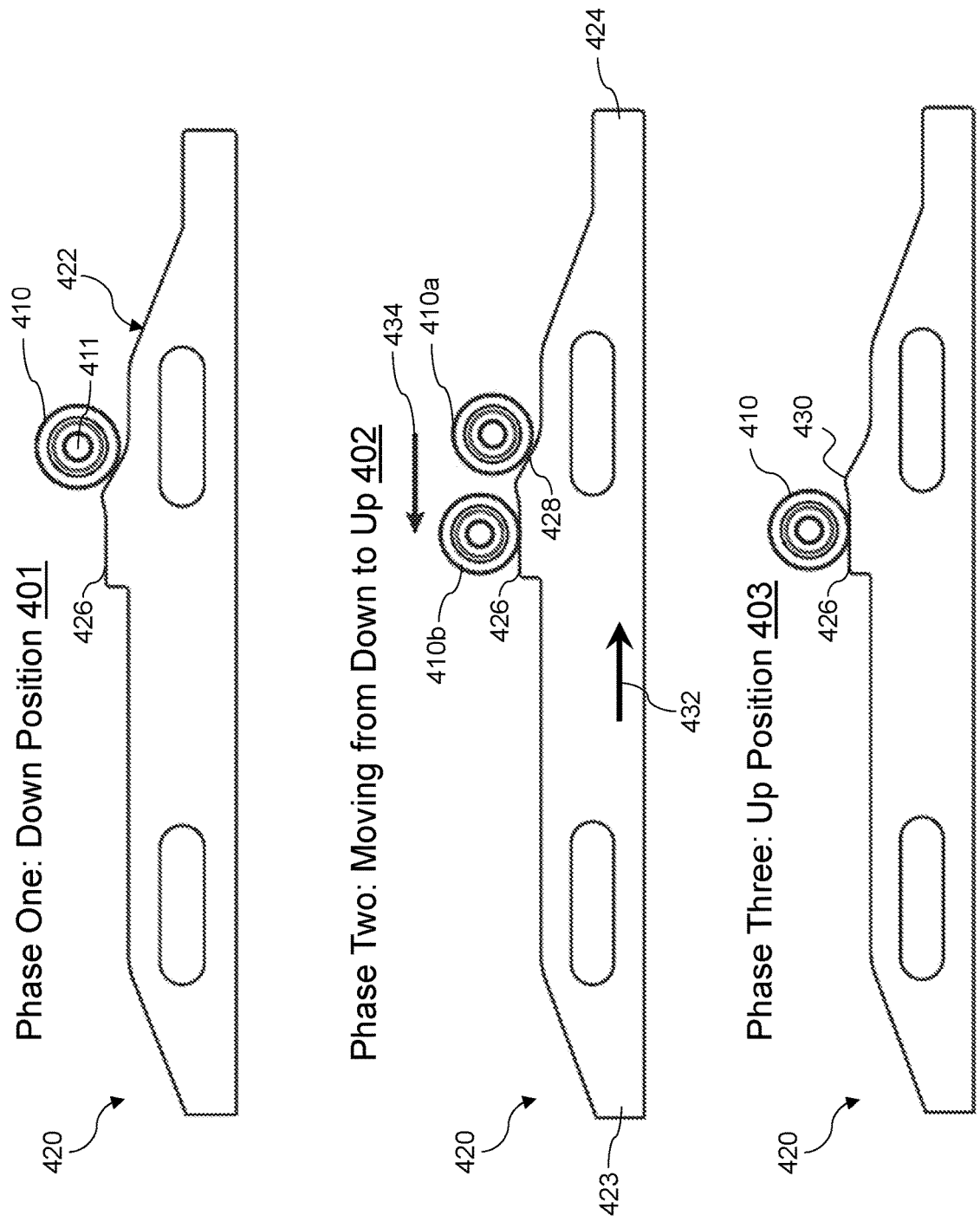
FIG. 4 shows a cam engaged with followers in multiple positions to demonstrate moving an extruder of an extruder assembly from a 'down' position to an 'up' position.

FIG. 4 shows a cam engaged with followers in multiple positions to demonstrate moving an extruder of an extruder assembly from a 'down' position (or active position or printing height) to an 'up' position (or inactive position or non-printing height). The cam 420 and the follower 410 shown in this figure may be the same as, or similar to, the cam 220 and first follower 210 discussed above with reference to FIGS. 2 and 3.

Turning back to FIG. 4, as shown in phase one 401, in the down position of an extruder that includes, or is engaged with, the follower 410 that is structurally configured to traverse along the working surface 422 of the cam 420, the follower 410 may be disposed in a position adjacent to (and not on) a plateau 426 of the working surface 422 (e.g., disposed at a peak of the working surface 422). The position of the follower 410 may be fixed relative to the extruder, but the follower 410 may be structurally configured to rotate about an axis 411—thus, the position of the axis 411 may be fixed relative to the extruder, where movement of the follower 410 (other than the rotation of the follower 410) may cause a corresponding movement of the extruder.

As shown in phase two 402, when the cam 420 is moved in a first direction 432, the follower 410 may move in a second direction 434 along the working surface 422 of the cam 420 from a first position 410a to a second position 410b. That is, the follower 410 may move along the working surface 422 toward the first end 423 of the cam 420 and away from the second end 424 of the cam 420. This movement of the follower 410 in the second direction 434 may cause the follower 410 to traverse up a ramped portion 428 of the working surface 422 in the second direction 434 toward the plateau 426 of the working surface 422. This movement may cause a change in the z-axis position of the follower 410 (and thus the extruder to which it is fixedly engaged), where the change in the z-axis position of the follower 410 corresponds to the z-axis height difference between a region of the working surface 422 disposed below the plateau 426 (e.g., a region on or below the ramped portion 428) and the plateau 426 of the working surface 422. This z-axis height change is demonstrated by the first position 410a and the second position 410b of the follower 410 shown in phase two 402.

Phase three 403 shows the follower 410 in an up position. Specifically, in phase three 403, the z-axis height position of the follower 410 may be located above its z-axis height position in phase one 401, demonstrating that the z-axis height of the follower 410 (and thus the extruder to which it is fixedly engaged) may change between the down position shown in phase one 401 and the up position shown in phase three 403. Further, in phase three 403, in the up position of the extruder that is engaged to the follower 410, the follower 410 may be disposed in a position on the plateau 426 of the working surface 422. In this position, movement of the cam 420 in the second direction 434 may cause the follower 410 to revert back to its position shown in phase one 401.

It will also be noted that the cam 420 may include a ridge 430 or other similar feature to provide a bi-stable position for the follower 410 on the plateau 426. This may help to prevent the cam 420 from drifting in an opposite direction and releasing the follower 410 during use before a force is applied to the second end 424 of the cam 420 to purposefully lower the follower 410 and the associated extruder into an active position. That is, the working surface 422 may include the plateau 426 disposed above the ramped portion 428 to support an extruder in an inactive, non-printing position. The working surface 422 may further include the ridge 430 having a height greater than the plateau 426. Specifically, the ridge 430 may be positioned between the plateau 426 and the ramped portion 428 to bi-stably retain an extruder in the inactive position (e.g., when the extruder is not engaged with the damper as described herein). However, inclusion of the ridge 430, although useful for maintaining a position of the follower on the plateau 426 as shown in phase three 403, may cause the follower 410 to "hop" over the ridge 430 when traversing to the down position. Such hopping may cause unwanted noise and vibration that can eventually damage components of an extruder assembly or three-dimensional printer. Thus, one or more of a support and a damper as described elsewhere herein may be advantageously included for use with such an extruder assembly to, inter alia, mitigate such unwanted noise and vibration.

Figure 5:
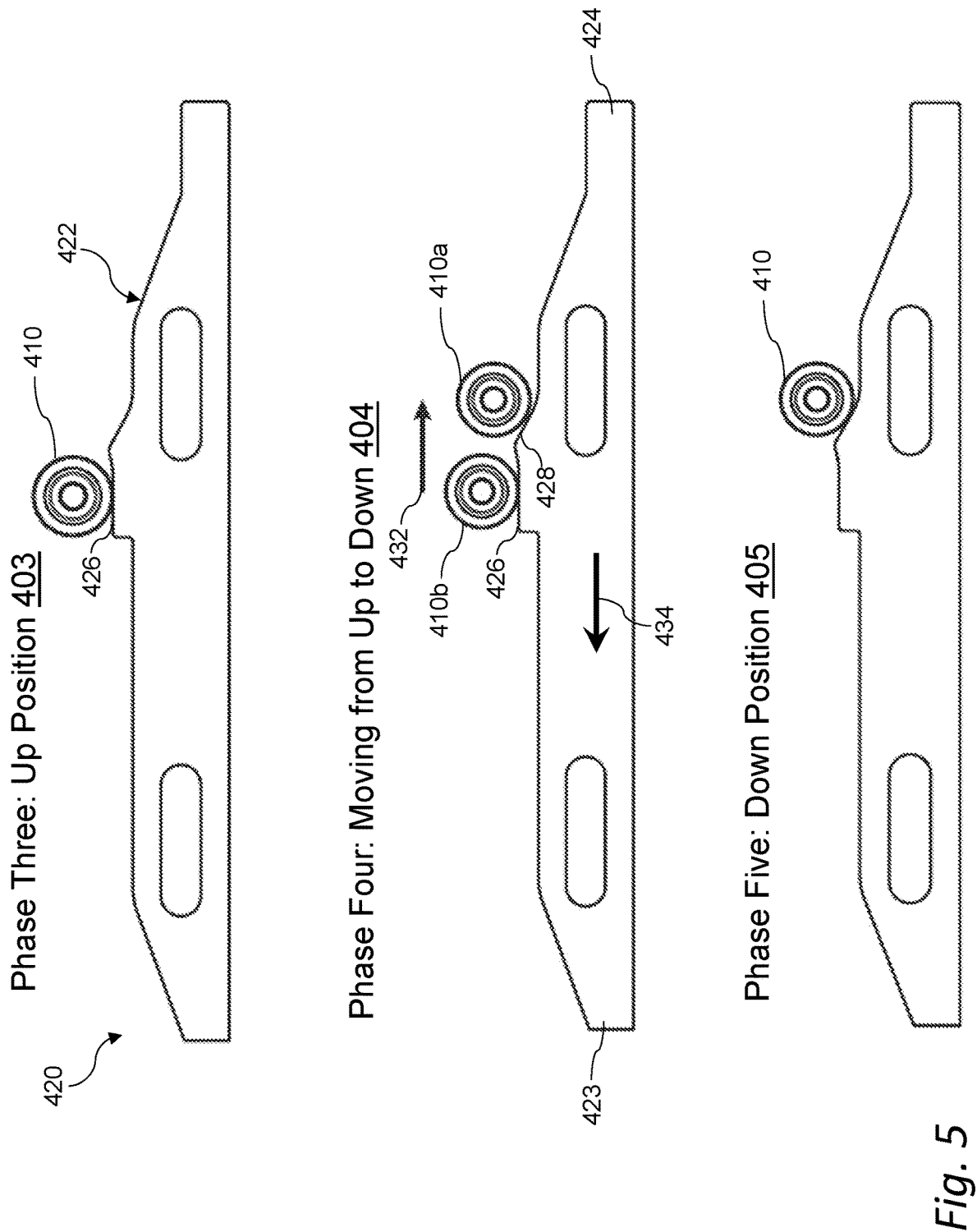
FIG. 5 shows a cam engaged with followers in multiple positions to demonstrate moving an extruder of an extruder assembly from an 'up' position to a 'down' position.

FIG. 5 shows a cam engaged with followers in multiple positions to demonstrate moving an extruder of an extruder assembly from an 'up' position to a 'down' position. The cam 420 in FIG. 5 may be the same as that described above with reference to FIG. 4, and thus the same reference numerals are generally used for these figures. More specifically, while FIG. 4 demonstrates movement of the follower 410 from a lower z-axis height position to a higher z-axis height position, FIG. 5 shows the converse—i.e., movement of the follower 410 from a higher z-axis height position to a lower z-axis height position.

Phase three 403 of FIG. 5 is the same as phase three 403 shown in FIG. 4, where the follower 410 is disposed in an up position, e.g., on the peak 426 of the working surface 422 of the cam 420. As stated above, and as demonstrated by phase four 404 and phase five 405 described below, movement of the cam 420 in the second direction 434 may cause the follower 410 to revert back to a down position.

As shown in phase four 404, when the cam 420 is moved in the second direction 434, the follower 410 may move in the first direction 432 along the working surface 422 of the cam 420 from the second position 410b to the first position 410a. That is, the follower 410 may move along the working surface 422 toward the second end 424 of the cam 420 and away from the first end 423 of the cam 420. This movement of the follower 410 in the first direction 432 may cause the follower 410 to traverse down the ramped portion 428 of the working surface 422 in the first direction 432, i.e., off of and away from the plateau 426 of the working surface 422.

Phase five 405 represents the down position for the follower 410 (and thus the extruder to which it may be fixedly engaged), where phase five 405 may be the same as phase one 401 of FIG. 4.

It will be understood that such a downward movement in FIG. 5 of the follower 410 and the extruder (or carriage) to which it is engaged can be noisy and/or may cause undesired vibrations. Thus, the present teachings may include features to mitigate such noise and vibration. One such feature may include the size and shape of the working surface 422 itself. That is, by including a ramped portion 428 (or another similar feature) that has a relatively shallow slope/incline, an extruder can be gradually lowered into an active position, and the accompanying mechanical noise and vibration can be mitigated. Additional or alternative features to mitigate such noise and vibration are described below.

FIG. 6 shows an extruder assembly including a support, and FIG. 7 shows the support engaged with a follower. Specifically, these figures show a carriage 650 of an extruder assembly 600 (which may be the same or similar to any of the extruder assemblies described herein), a gantry 660, and a support 670. FIG. 6 may represent an up position for a first extruder in the carriage 650, while FIG. 7 may represent moments before the first extruder is disposed in a down position. In general, the support 670 and a corresponding damper 680 may be used to mitigate noise and/or vibration when moving an extruder of the extruder assembly 600 along one or more axes. Also, or instead, the support 670 may be used in conjunction with the cam 620 to raise and lower an extruder of the extruder assembly 600.

The carriage 650 may be structurally configured to hold or otherwise couple with one or more extruders of the extruder assembly 600—e.g., the carriage 650 of the exemplary embodiment in FIGS. 6 and 7 may be structurally configured to couple with two extruders. Specifically, the carriage 650 may include one or more sub-carriages each structurally configured for housing or otherwise coupling to an extruder. For example, the carriage 650 of FIGS. 6 and 7 includes a first sub-carriage 651 and a second sub-carriage 652, which may be structurally configured to engage with the first extruder and the second extruder, respectively, such as the first extruder and the second extruder described above. Thus, the carriage 650 may be structurally configured to receive one or more modular extruders therein, e.g., within one or more cavities 654 defined by a structure of the carriage 650. In this manner, a first extruder may be supported on the carriage 650, where the first extruder defines a first extrusion path, and where movement of the first follower 610 along the working surface of the cam 620 changes a z-axis position of the first extruder. For example, the working surface of the cam 620 may be movable relative to the first extruder along the x-axis or the y-axis. In addition to the first extruder, a second extruder may be supported on the carriage 650, where the second extruder defines a second extrusion path different than the first extrusion path of the first extruder.

In certain implementations, such as the embodiment of FIGS. 6 and 7, the carriage 650 may include or otherwise be coupled to a cam 620, a first follower 610, and a second follower 612. Alternatively, one or more of these components may be included on one or more modular extruders that are configured for coupling to or within the carriage 650. Regardless, one or both of a sub-carriage and an extruder may be structurally configured to move with one or more of the first follower 610 and the second follower 612. Thus, one or more of the first follower 610 and the second follower 612 may be positionally (but not rotationally) fixed relative to the carriage 650 and/or an extruder coupled thereto.

The carriage 650 (or a portion thereof, such as one or more of the first sub-carriage 651 and the second sub-carriage 652) may be pivotally connected to, or pivotally-disposed relative to, the gantry 660. Thus, when the carriage 650, an extruder, or a sub-carriage is lifted (e.g., via the first follower 610 through movement thereof along the working surface of the cam 620), that component may pivot or otherwise move up relative to the gantry 660.

The gantry 660 may generally include a structure upon which the extruder assembly 600 resides within a three-dimensional printer. For example, the gantry 660 may be connected to, or be in communication with, an x-y-z positioning assembly for positioning the extruder assembly 600 within a build volume of a three-dimensional printer. In general, the gantry 660 may include a guide surface 662 upon which the extruder assembly 600 can move along one or more of the x-axis and the y-axis. For example, the extruder assembly 600 may include a gantry 660 and a carriage 650 as described herein, where the gantry 660 has a guide surface 662 defining an axis perpendicular to the z-axis, a first extruder is supported on the carriage 650 (e.g., in the first sub-carriage 651), and the carriage 650 is movable along the guide surface 662 of the gantry 660 in at least one direction along the axis that is perpendicular to the z-axis (e.g., an x-axis or a y-axis). In this manner, and as shown in FIGS. 6 and 7, at least one of the damper 680 or the support 670 may be disposed in a fixed location along the axis that is perpendicular to the z-axis.

The gantry 660 may further include, or otherwise be engaged with, the support 670. Thus, the support 670 may reside on the gantry 660—for example, the support 670 may be fixed on the gantry 660 and engageable with the extruder assembly 600 via movement of the extruder assembly along an axis that intersects the z-axis (e.g., an x-axis or a y-axis). The support 670 may also or instead be coupled to a side of a three-dimensional printer or another component of the three-dimensional printer. Regardless, the support 670 may be engageable with an end of the cam 620 to move the cam 620 (e.g., translate, toggle, or slide the cam 620) relative to the carriage 650.

As described above, the cam 620 may have a working surface movable relative to at least one of the extruders of the extruder assembly 600 and shaped to translate a first movement of the cam 620 along an x-axis or a y-axis into a second movement of the first follower 610 along the z-axis. In this manner, the first follower 610 may be movable along the working surface of the cam 620 as the working surface moves relative to one or more of the first extruder and the first sub-carriage 651 to raise the first follower 610 along the z-axis. The support 670 may be engageable with the cam 620 to reverse the first movement of the cam 620 and lower the working surface adjacent to the first follower 610 along the z-axis. Thus, the working surface of the cam 620 may be movable relative to one or more of the first extruder and the first sub-carriage 651 in response to a force associated with engagement of the support 670 with the cam 620.

The damper 680 may be coupled to the support 670. The damper 680 may be engageable with one or more of the first extruder and the first sub-carriage 651 to receive a z-axis load therefrom and to decouple the first follower 610 from the working surface of the cam 620 as the support 670 lowers the working surface of the cam 620 adjacent to the first follower 610. More specifically, the damper 680 may engage with the second follower 612.

In certain implementations, the damper 680 may include an arm that is cantilevered from the support 670 along one or more of the x-axis or y-axis. In this manner, the support 670, the damper 680, and the cam 620 may work together to adjust a z-axis position of an extruder in the carriage 650 on the gantry 660. For example, the cam 620 may be a linear cam, where the working surface of the cam 620 has a first two-dimensional profile in a plane defined by the z-axis and an intersecting (e.g., perpendicular) axis such as the y-axis. The arm of the damper 680 may have a second two-dimensional profile in the plane defined by the z-axis and the y-axis, where the arm of the damper 680 is engageable with the second follower 612 to move the second follower 612 along the second two-dimensional profile of the arm as the z-axis load of an extruder is supported on the arm. As demonstrated in FIGS. 6 and 7, the first two-dimensional profile of the working surface of the cam 620 may be different from the second two-dimensional profile of the arm of the damper 680. However, although different, these dimensional profiles may be sized and shape to work in conjunction with one another to mitigate noise or vibration when adjusting the z-axis position of an extruder in the extruder assembly 600. For example, the contact surface 682 of the damper 680 may include an incline to gradually lower the second follower 612 as the carriage moves away from the support 670.

As described herein, the second follower 612 may be disposed on or within one or more of the first extruder and the first sub-carriage 651. As best shown in FIG. 7, the second follower 612 may be movable along the damper 680, where the z-axis load from one or more of the first extruder and the first sub-carriage 651 is receivable by the damper 680 via the second follower 612. To this end, the damper 680 may include a contact surface 682 for the second follower 612, where the contact surface 682 is shaped to smoothly lower one or more of the first extruder and the first sub-carriage 651 into a working position along the z-axis as the extruder assembly 600 moves away from the support 670 along either the x-axis or the y-axis, depending upon the configuration of the gantry 660.

As discussed above, the first follower 610 and the second follower 612 may be disposed on the carriage 650 and/or an extruder of the extruder assembly 600, where z-axis movement of one or more of the first follower 610 and the second follower 612 may similarly provide z-axis movement to the carriage 650 (or a portion thereof such as a sub-carriage) and/or an extruder of the extruder assembly 600. In general, the first follower 610 may be movable along the working surface of the cam 620 (e.g., in rolling contact with the working surface of the cam 620), and the second follower 612 may be movable along the damper 680 (e.g., in rolling contact with the damper 680 or support 670). To this end, the first follower 610 and the second follower 612 may be spaced apart from one another at least along the z-axis. The first follower 610 and the second follower 612 may also or instead be spaced apart from one another along one or more of the x-axis and the y-axis.

Thus, generally as shown in FIGS. 6 and 7, the support 670 may have a first surface 671 (e.g., a side surface) that contacts the cam 620 to move the cam 620 in a first direction 601 along the y-axis (or the x-axis) as the carriage 650 approaches the support 670 along a second direction 602. The support 670 may further include, or otherwise work in conjunction with, a damper 680 having a contact surface 682 that receives a z-axis load of an extruder (or the sub-carriage configured for engagement with the extruder) as the carriage 650 approaches the support 670 by traveling in the second direction 602.

As further shown in FIG. 7, engagement of the first surface 671 of the support 670 with the cam 620 to cause movement of the working surface of the cam 620 in the first direction 601 may eventually fully disengage the first follower 610 from the working surface of the cam 620. In this manner, without the presence of the damper 680 in such an embodiment, the first extruder would drop down relatively abruptly, which could cause unwanted noise or vibration. However, the damper 680 may receive a z-axis load from the first extruder through engagement with the second follower 612. In this manner, as the carriage 650 continues to move away from the support 670 in the first direction 601, the first extruder can be gradually lowered, particularly where the contact surface 682 of the damper 680 includes a sloped or inclined surface to provide a gradual z-axis position change for the second follower 612 (and thus an extruder or sub-carriage engaged thereto).

FIG. 8 shows a detail of a support engaged with a follower. Specifically, this figure shows a detail of a support 870 (which may be the same as or similar to the supports 670 shown and described above with reference to FIGS. 6 and 7) engaged with a second follower moving downward in the direction of the arrow 801 from a first position 812a to a second position 812b. More particularly, the support 670 may include a damper 880 having a contact surface 882 that is sized and shaped (e.g., includes a two-dimensional profile in a plane that intersects a z-axis, such as a plane defined by an x-axis and a y-axis) to gradually change the z-axis position of the second follower from the first position 812a to the second position 812b, and to then fully release the second follower as the second follower moves beyond the vertical support limit of the damper 880. To this end, the two-dimensional profile of the contact surface 882 may include one or more sloped portions. In particular, an inclined surface of the contact surface 882 may include a first surface 884 angled or sloped to receive a load from an extruder as a plurality of extruders move toward the support 870 and a second surface 886 angled or sloped to smoothly and continuously lower the extruder into a working position as the plurality of extruders move away from the support 870. In this manner, the second follower can be released from contact with the contact surface 882 of the damper 880 in a relatively gradual manner, which can aid in mitigating noise or vibration of the associated change in z-axis position for an extruder or a sub-carriage that is coupled to the second follower.

Figure 10:
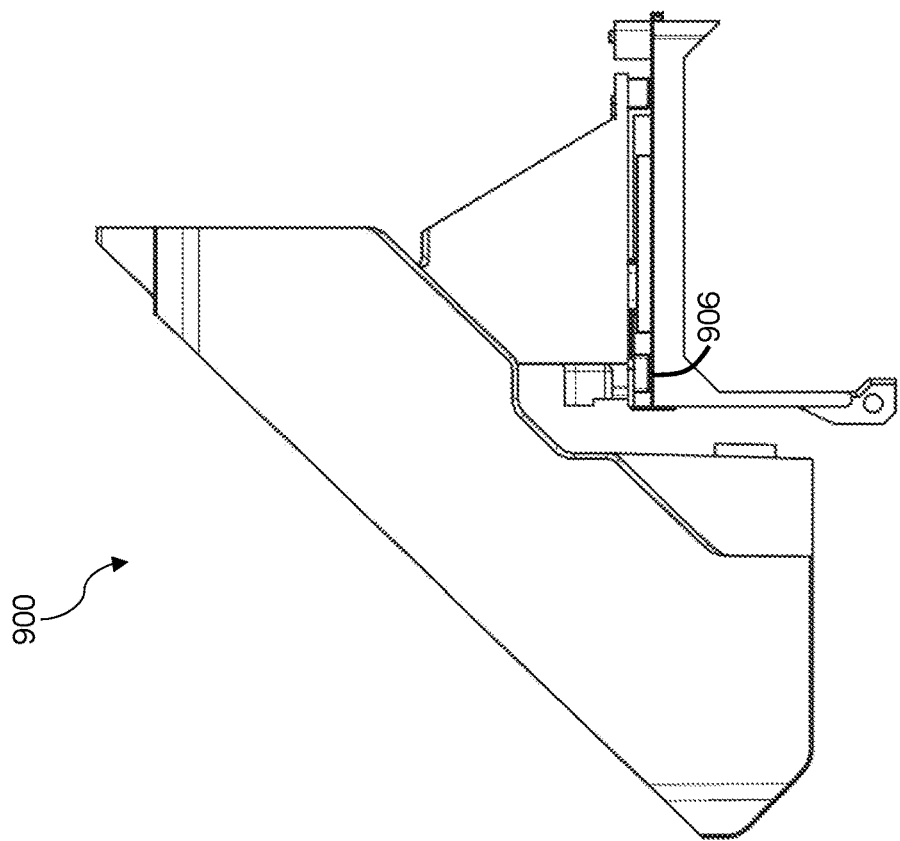
FIG. 10 shows a side view of an extruder in a 'down' position.
Figure 9:
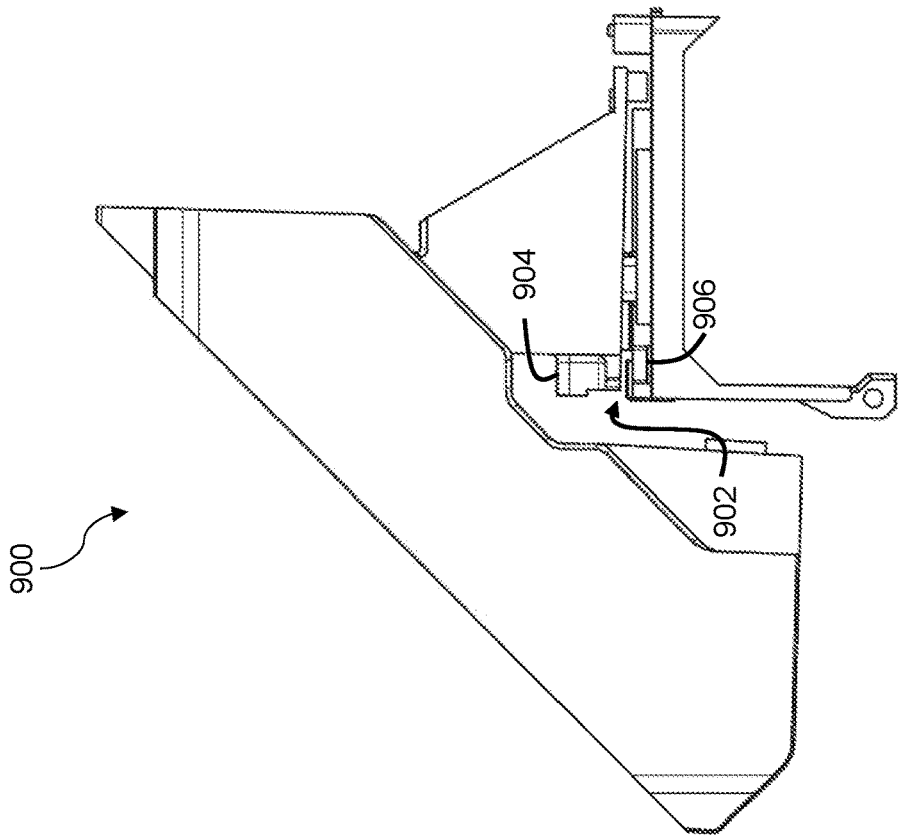
FIG. 9 shows a side view of an extruder in an 'up' position.

FIG. 9 shows a side view of an extruder in an 'up' position, and FIG. 10 shows a side view of an extruder in a 'down' position. These figures demonstrate how the extruder 900 (or a carriage or sub-carriage to which the extruder is coupled) may be pivotable to change a z-axis position thereof. As shown in FIG. 9, a gap 902 may be present between an extruder portion 904 and a structure 906, e.g., when the extruder 900 (and therefore the extruder portion 904) is lifted into an inactive position using the techniques described herein. Also, as shown in FIG. 10, the extruder 900 in the active or down position may contact the other structure 906, which may be a carriage, a sub-carriage, frame, or another component. This contact, if initiated in a relatively abrupt and sudden manner, may cause undesired noise and/or vibration in a three-dimensional printer. This may be further amplified if the components that come in contact from a downward movement of an extruder are each made from a metal or a similar material. Thus, damping techniques as described herein may be advantageous to mitigate such undesired noise or vibration.

Therefore, as described herein, a three-dimensional printer may include a build plate having a substantially planar surface and a plurality of extruders, where each of the plurality of extruders defines a respective extrusion orifice directed toward the build plate, and where each extrusion orifice is supported above the build plate at a respective height along a z-axis perpendicular to the substantially planar surface of the build plate. The three-dimensional printer may further include a cam having a working surface engageable with a first extruder of the plurality of extruders, where the working surface of the cam is moveable relative to the first extruder to change a z-axis position of the first extruder relative to at least one other one of the plurality of extruders. The three-dimensional printer may also or instead include a support engageable with the cam to move the cam in a manner that lowers the working surface supporting the first extruder, and a damper coupled to the support. The damper may be engageable with the first extruder to receive a z-axis load from the extruder thereby decoupling the first extruder from the cam as the contact with the support lowers the working surface.

The plurality of extruders and the cam may be movable together in a first direction parallel to the substantially planar surface of the build plate (e.g., along one or more of the x-axis and the y-axis). Further, the support may be selectively engageable with the cam to move the cam relative to the plurality of extruders in a second direction that is opposite the first direction, where a movement of the cam relative to the first extruder in the second direction decouples the first extruder from the cam.

As discussed above, the damper may include an arm cantilevered from the support in a direction parallel to the substantially planar surface of the build plate. The arm may include an inclined surface extending obliquely to the substantially planar surface of the build plate. This inclined surface may be positioned to make an initial contact with the first extruder as the damper engages the first extruder, where the z-axis load of the first extruder is received by the arm as the first extruder moves toward the support and away from the build plate along the inclined surface. The inclined surface may include a first surface angled to receive a load from the first extruder as the plurality of extruders move toward the support and a second surface angled to smoothly and continuously lower the first extruder into a working position as the plurality of extruders move away from the support.

Figure 11:
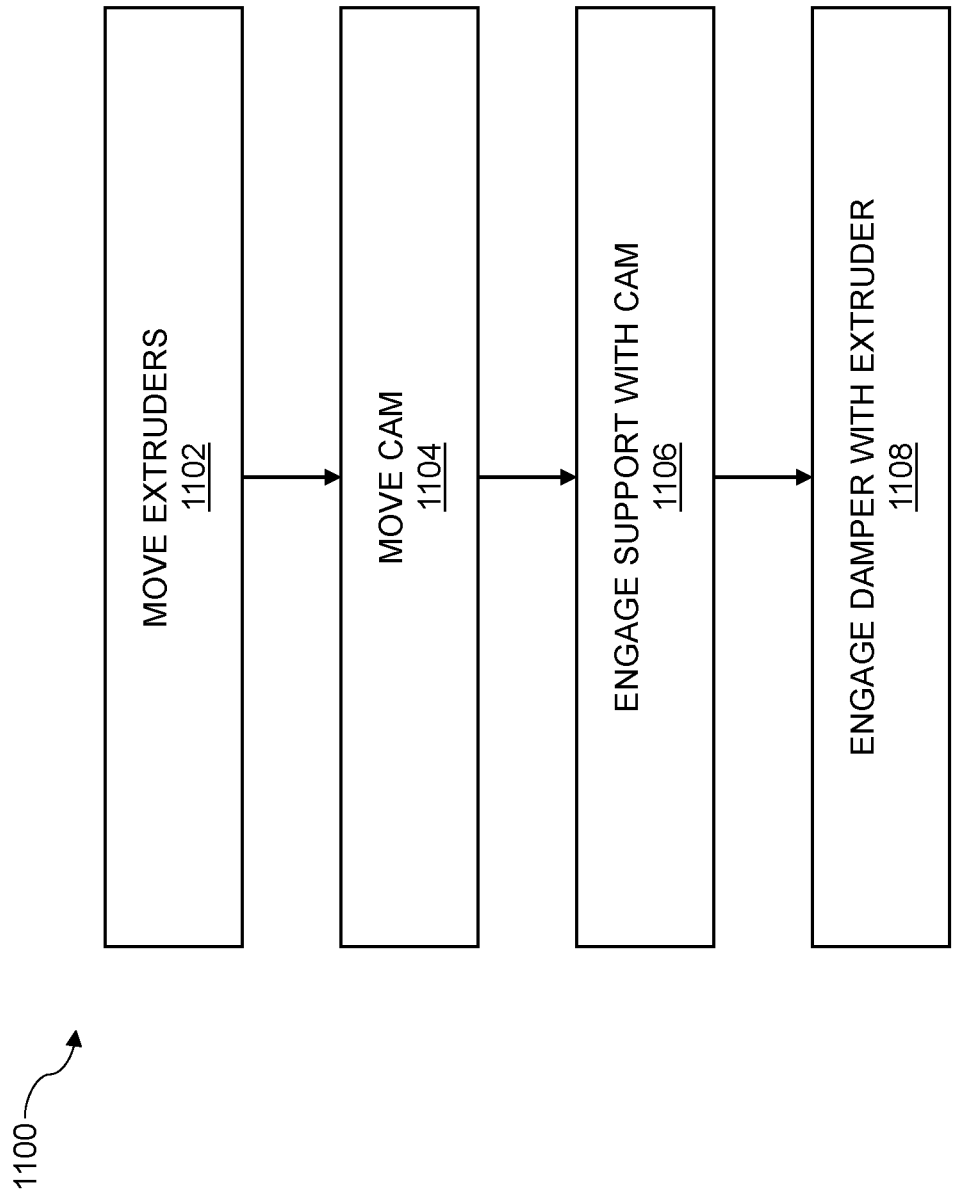
FIG. 11 is a flowchart of a method for changing a z-axis position of an extruder in an extruder assembly featuring a plurality of extruders.

FIG. 11 is a flowchart of a method for changing a z-axis position of an extruder in an extruder assembly featuring a plurality of extruders. The method 1100 may utilize any of the extruder assemblies, three-dimensional printers, or other systems and components described herein. In general, the method 1100 may be used for extruder height toggling in a three-dimensional printer having a multi-extruder assembly.

As shown in step 1102, the method 1100 may include moving a plurality of extruders within a plane parallel to a substantially planar surface of a build plate, e.g., along an x-y plane. Each of the plurality of extruders may define a respective extrusion orifice supported above the build plate at a respective height above the substantially planar surface of the build plate. For example, the plurality of extruders may include a first extruder disposed at a printing height, a second extruder disposed at a non-printing height, with a cam coupled to (or otherwise in direct or indirect mechanical engagement with) the extruders for changing the z-axis height of one or more of the extruders.

To facilitate changing the z-axis height of an extruder, one or more of the plurality of extruders may be movable relative to a gantry along a z-axis. For example, one or more of the plurality of extruders (or a sub-carriage or the like that holds one or more of the plurality of extruders) may be pivotally engaged (e.g., through a hinged connection or the like) to the gantry or a component coupled to the gantry (e.g., a carriage or a portion thereof). In this manner, a z-axis position of an extrusion orifice of an extruder may be movable via a pivoting motion of the extruder. Thus, a force applied to an extruder (or a component engaged with the extruder, such as a follower) may provide such a pivoting motion to move the z-axis position of the extrusion orifice of the extruder. This may be used to toggle the extruder between a printing height and a non-printing height within a build volume of a three-dimensional printer.

As shown in step 1104, the method 1100 may include moving a working surface of a cam relative to a first extruder of the plurality of extruders. Movement of the working surface may change a z-axis position of the first extruder relative to the build plate. More particularly, the working surface of the cam may engage with a first follower that is movable along the working surface, following a contoured path corresponding to a two-dimensional profile of the working surface of the cam. This two dimensional profile of the working surface of the cam may include one or more of peaks, valleys, plateaus, ramped surfaces, and so on corresponding to different z-axis heights relative to the substantially planar surface of the build plate. Thus, moving the working surface of the cam may cause the follower to traverse along the contoured path corresponding to the two-dimensional profile, thus changing the z-axis height of the follower. The follower may be configured to freely rotate relative to the first extruder, but may otherwise be in a fixed position relative to the first extruder. Thus, when the follower changes z-axis height because of movement thereof along the working surface, the first extruder may similarly change its z-axis height. In this manner, toggling or other movement of the working surface may cause a change in z-axis height for the first extruder.

As shown in step 1106, the method 1100 may include engaging a support with the cam to provide movement of the working surface. That is, the plurality of extruders and the cam may move together in a first direction, and engaging the support with the cam may move the cam in a second direction, opposite the first direction, to provide movement of the working surface of the cam.

In this manner, the method 1100 may include moving the cam from a first position to a second position relative to the plurality of extruders for changing the z-axis height of one or more of the extruders. Moving the cam between these positions may be accomplished by moving the plurality of extruders such that the cam contacts a portion of the three-dimensional printer, e.g., a portion external to the plurality of extruders or the carriage, such as the support. Thus, the method 1100 may generally include moving, through movement of the cam, an extruder of a multi-extruder assembly. For example, this may include one or more of: (i) moving, through movement of the cam, a first extruder from the printing height to the non-printing height; and/or (ii) moving, through movement of the cam, a second extruder from the non-printing height to the printing height.

As shown in step 1108, the method 1100 may include engaging a damper with the first extruder to receive a z-axis load from the first extruder. More particularly, an extruder assembly may include a second follower that is movable along a contact surface (e.g., a top surface) of the damper. Similar to the first follower, the second follower may be configured to freely rotate relative to the first extruder, but may otherwise be in a fixed position relative to the first extruder. Thus, when the second follower changes z-axis height because of movement thereof along the working surface, the first extruder may similarly change its z-axis height. In this manner, if the contact surface includes features to gradually change the z-axis position of the second follower (e.g., from a greater z-axis height to a lower z-axis height relative to the build plate), the first extruder may similarly change its z-axis position in a relatively gradual manner. This may mitigate noise or vibration caused by lowering the z-axis height of an extruder.

Thus, in general, the present teachings may include one or more followers and a cam that work together to move an extruder of a multi-extruder assembly along a z-axis. In some instances, a follower is in a fixed position relative to the extruder and the cam moves the follower thereby moving the extruder. However, it will be understood that, also or instead, the working surface may be in a fixed position relative to the extruder and a follower (e.g., on a cam) may move the working surface thereby moving the extruder, for example as explained in more detail with reference to FIGS. 12 and 13 described below.

Figure 13:
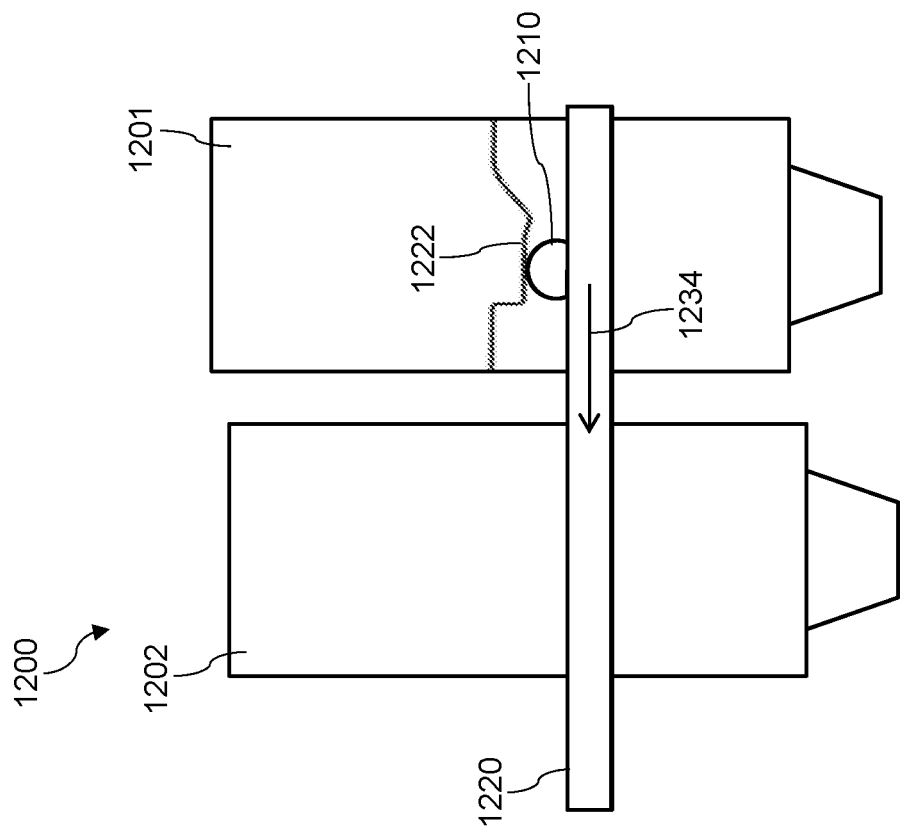
FIG. 13 shows an extruder assembly with a first extruder in an 'up' position.
Figure 12:
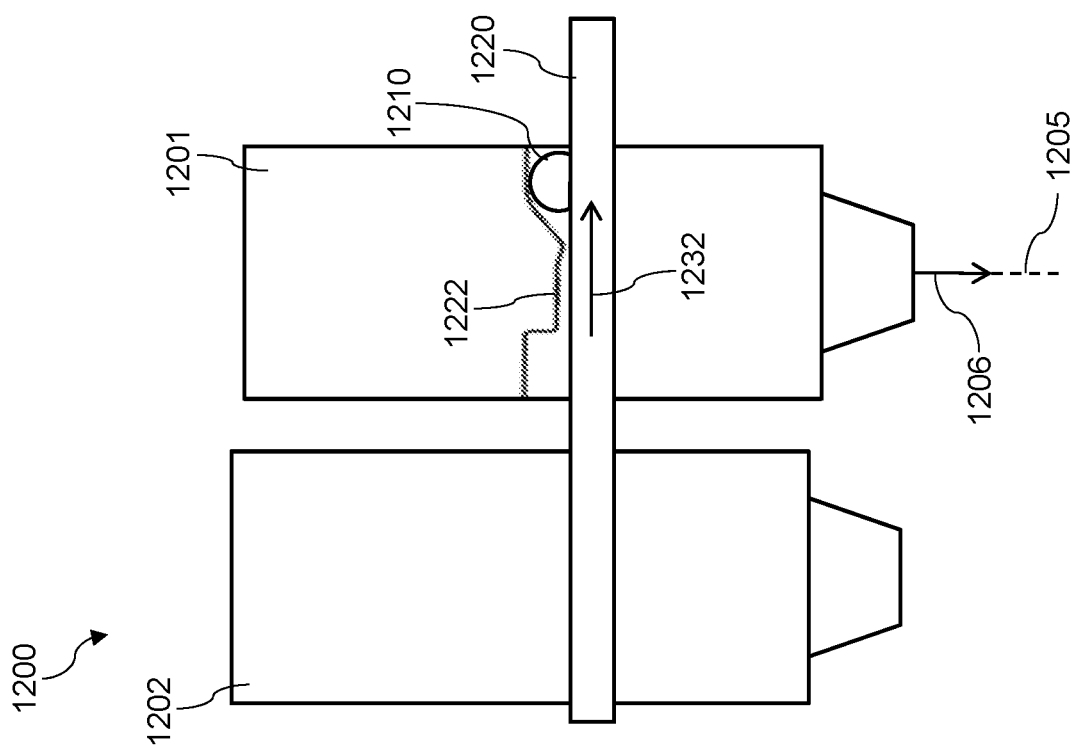
FIG. 12 shows an extruder assembly with a first extruder in a 'down' position.

FIG. 12 shows an extruder assembly with a first extruder in a 'down' position, and FIG. 13 shows an extruder assembly with a first extruder in an 'up' position. The extruder assembly 1200 may be similar to those described elsewhere herein, but in this exemplary embodiment of an extruder assembly 1200, the working surface 1222 may be fixed on one or more extruders, where the cam 1220 includes a follower that moves along the fixed working surface 1222 of the extruder to change a z-axis position of the extruder. The extruder assembly 1200 may thus generally include a first extruder 1201, a second extruder 1202, and a cam 1220 structurally configured to mechanically control a z-axis position of one or more of the first extruder 1201 and the second extruder 1202.

The first extruder 1201 may define a first extrusion path 1206, where at least one portion of the first extrusion path defines a z-axis 1205. As discussed above, the first extruder 1201 may include a working surface 1222 shaped to translate a horizontal movement (e.g., in one or more of the first direction 1232 and the second direction 1234) along the working surface 122 into a vertical movement of the first extruder 1201 along the z-axis 1205.

The cam 1220 may have a first follower 1210 that is horizontally movable relative to the first extruder 1201 and positioned to travel along the working surface 1222. The first follower 1210 may be the same as or similar to any of the followers described herein, e.g., including a bearing, a rotating wheel, or the like. In general the first follower 1210 may be disposed in a fixed location on the cam 1220, i.e., such that horizontal movement of the cam 1220 causes a similar horizontal movement for the first follower 1210, e.g., along the working surface 1222. That is, the first follower 1210 may be movable along the working surface 1222 of the of the first extruder 1201 as the first follower 1210 moves in a first direction 1232 relative to the first extruder 1201 to lower the working surface 1222 along the z-axis 1205.

It will be understood that the exemplary embodiment of the extruder assembly 1200 shown in FIGS. 12 and 13 may further include one or more of a support and a damper as shown and described elsewhere herein. That is, the extruder assembly 1200 may include a support (not shown in FIGS. 12 and 13) engageable with the cam 1220 to move the cam 1220 in a second direction 1234 opposing the first direction 1232 to raise the working surface 1222 along the z-axis 1205. The support may also or instead be engageable with the cam 1220 to move the cam 1220 in the first direction 1232 to lower the working surface 1222 along the z-axis 1205. Further, the extruder assembly 1200 may include a damper (not shown in FIGS. 12 and 13), which may or may not be coupled to the support. The damper may be engageable with the first extruder 1201 to receive a z-axis load from the first extruder 1201 and to decouple the first follower 1210 from the working surface 1222 as the support lowers the working surface 1222 beneath first follower 1210 in response to a movement in the first direction 1234.

In general, and as described above, the cam may be a "basher bar" or a "toggle bar" on the carriage that moves horizontally to toggle the vertical height of one of the extruders of a multi-extruder assembly, e.g., from an inactive position (with a nozzle position disposed above a printing plane along the z-axis) to an active position (with a nozzle position disposed at or below a printing plane along the z-axis). Furthermore, this toggle bar may extend vertically from both sides of the multi-extruder assembly so that the height adjustment can be initiated by contacting a side of the multi-extruder to any surrounding structure, e.g., the frame of a printer, or the support, damper, or other features described herein. It will be appreciated that this configuration facilitates passive, mechanical control of extruder height wherein the extruder is raised and lowered by contacting opposing sides of the multi-extruder assembly, e.g., by moving the multi-extruder assembly in the x-y plane of a build volume to contact a surrounding frame or other surrounding structures and move the toggle bar back and forth. In this manner, extruder height can advantageously be adjusted without the need for additional active components such as motors, electronic actuators, or the like.

Thus, in one aspect, an extruder assembly includes one or more extruders—e.g., a first extruder and a second extruder movably coupled to the first extruder to permit vertical movement of the second extruder relative to the first extruder, or vice-versa. The extruder assembly may further include a coupler structurally configured to mechanically control a z-axis position of one extruder relative to another extruder in the extruder assembly (e.g., the second extruder relative to the first extruder). The coupler may include one or more of the components described herein for moving the z-axis position of an extruder, such as a cam and one or more followers. For example, the coupler may include a horizontal slider structurally configured to cause upward movement of the second extruder in response to a first horizontal movement in a first direction and to permit downward movement of the second extruder in response to a second horizontal movement in a second direction opposing the first direction. The coupler may extend horizontally from the extruder assembly to expose a first end and a second end that provide control surfaces to move the coupler horizontally in the first direction and the second direction respectively.

The extruder assembly featuring such a coupler may further include a support in a predetermined position within a three-dimensional printer. The support may include a first surface and a second surface, where the first surface is shaped to receive and vertically support the second extruder as the extruder assembly horizontally contacts the support, and where the second surface is shaped to concurrently move the coupler in the second direction as the extruder assembly horizontally contacts the support. The coupler or the second extruder may include a working surface with a ramp shaped to gradually raise and lower the second extruder between an active position with an exit orifice below a lowest point of the first extruder and an inactive position with the exit orifice above the lowest point of the first extruder. Further, the working surface may include a plateau above the ramp to support the second extruder in the inactive position and a ridge. The ridge may have a height greater than the plateau and the ridge may be positioned between the plateau and the ramp to bi-stably retain the second extruder in the inactive position when the extruder assembly is not engaged with the damper.

Movement of an extruder in a multi-extruder assembly along the z-axis may be assisted by, or facilitated by, a biasing member, e.g., a flexible steel spring. For example, in certain implementations, an extruder in a multi-extruder assembly is biased toward an at-rest position, and movement of a cam as described herein may act against this biasing force to move the extruder from the at-rest position to another position (e.g., a printing position).

The extruder or the carriage may include a hinged connection, where z-axis motion is facilitated by the hinge, e.g., such that one or more of the extruders (e.g., both of the extruders) pivots about an axis through the hinge. This pivoting motion may also or instead serve to engage and disengage an extruder from a single, common filament drive wheel, so that an inactive extruder is disengaged from contact with the drive wheel when in a raised, pivot position.

Further, a dual carriage assembly that includes mechanical toggling of one or multiple extruders or extruder components may lead to audible noise during operation. The present teachings, however, may be used to significantly reduce noise levels during operation without the need for additional electromechanical architecture.

The toggle for multiple extruders as described herein may include one or more of the following: (i) mechanical actuation to perform an upward toggle, where a follower rides along a working surface of a cam to push one side of a carriage from a down position to an up position; (ii) mechanical actuation used to perform a downward toggle, where a follower rides along the working surface of the cam and slides from the up position to the down position (e.g., this may be the opposite of the upward toggle); (iii)

mechanical damping for noise and vibration produced from toggling, e.g., from the follower sliding down the working surface of the cam.

Thus, in an aspect, a three-dimensional printer includes a first extruder and a second extruder movable independently from the first extruder in a z-direction within a build volume of the three-dimensional printer, the second extruder including a first bearing and a second bearing. The three-dimensional printer may also include a toggle bar slidably coupled to the second extruder, the toggle bar including an inclined surface positioned to raise the second extruder in the z-direction in response to a movement of the toggle bar in a first direction. The three-dimensional printer may further include a support arm having a second inclined surface to receive a load of the second extruder from the toggle bar as the second extruder approaches the support arm, the support arm further including a toggling surface to move the toggle bar in a second direction as the second extruder approaches the support arm, thereby displacing the toggle bar and permitting the second extruder to be lowered in the z-direction along the second inclined surface as the second extruder subsequently moves away from the support arm.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An extruder assembly, comprising:
   a first extruder including a first follower and a second follower, the first extruder defining a first extrusion path, and at least one portion of the first extrusion path defining a z-axis;
   a cam having a working surface movable relative to the first extruder and shaped to translate a first movement of the cam along an x-axis or a y-axis into a second movement of the first follower along the z-axis, the first follower movable along the working surface of the cam as the working surface moves relative to the first extruder to raise the first follower along the z-axis;
   a support engageable with the cam to reverse the first movement of the cam and lower the working surface adjacent to the first follower along the z-axis; and
   a damper coupled to the support, the second follower of the first extruder movable along the damper, the damper engageable with the first extruder to receive a z-axis load from the first extruder via the second follower and to decouple the first follower from the working surface of the cam as the support lowers the working surface of the cam adjacent to the first follower.

2. The extruder assembly of claim 1, wherein the working surface of the cam is movable relative to the first extruder in response to a force associated with engagement of the support with the cam.

3. The extruder assembly of claim 1, wherein the damper includes a contact surface for the second follower, the contact surface shaped to lower the first extruder into a working position along the z-axis as the first extruder moves away from the support along the x-axis or y-axis.

4. The extruder assembly of claim 1, wherein the first follower is movable along the working surface of the cam in rolling contact with the working surface of the cam, and the second follower is movable along the damper in rolling contact with the support.

5. The extruder assembly of claim 1, wherein the first follower and the second follower are spaced apart from one another at least along the z-axis.

6. The extruder assembly of claim 1, further comprising a gantry and a carriage, wherein the gantry has a guide surface defining an axis perpendicular to the z-axis, the first extruder is supported on the carriage, and the carriage is movable along the guide surface of the gantry in at least one direction along the axis perpendicular to the z-axis.

7. The extruder assembly of claim 6, wherein at least one of the damper or the support is in a fixed location along the axis perpendicular to the z-axis.

8. The extruder assembly of claim 6, further comprising a second extruder supported on the carriage, wherein the second extruder defines a second extrusion path, and movement of the first follower along the working surface of the cam changes a z-axis position of the first extruder.

9. The extruder assembly of claim 6, wherein the working surface of the cam is movable relative to the first extruder along the axis perpendicular to the z-axis.

10. The extruder assembly of claim 6, wherein the damper includes an arm cantilevered from the support along the axis perpendicular to the z-axis.

11. The extruder assembly of claim 10, wherein the cam is a linear cam, and the working surface of the cam has a first two-dimensional profile in a plane defined by the z-axis and the axis perpendicular to the z-axis.

12. The extruder assembly of claim 11, wherein the arm has a second two-dimensional profile in the plane defined by the z-axis and the axis perpendicular to the z-axis, the first extruder includes a second follower, and the arm is engageable with the second follower to move the second follower along the second two-dimensional profile of the arm as the z-axis load of the first extruder is supported on the arm.

13. The extruder assembly of claim 12, wherein the first two-dimensional profile of the working surface of the cam is different from the second two-dimensional profile of the arm.

14. An extruder assembly, comprising:
a first extruder including a first follower and a second follower, the first extruder defining a first extrusion path, and at least one portion of the first extrusion path defining a z-axis;
a gantry having a guide surface defining an axis perpendicular to the z-axis;
a carriage supporting the first extruder, the carriage movable along the guide surface of the gantry in at least one direction along the axis perpendicular to the z-axis;
a linear cam having a working surface movable relative to the first extruder and shaped to translate a first movement of the linear cam along an x-axis or a y-axis into a second movement of the first follower along the z-axis, the working surface of the linear cam having a first two-dimensional profile in a plane defined by the z-axis and the axis perpendicular to the z-axis, the first follower movable along the working surface of the linear cam as the working surface moves relative to the first extruder to raise the first follower along the z-axis;
a support engageable with the linear cam to reverse the first movement of the linear cam and lower the working surface adjacent to the first follower along the z-axis; and
a damper including an arm cantilevered from the support along an axis perpendicular to the z-axis, the arm having a second two-dimensional profile in the plane defined by the z-axis and the axis perpendicular to the z-axis, the arm engageable with the first extruder to receive a z-axis load from the first extruder and to decouple the first follower from the working surface of the linear cam as the support lowers the working surface of the linear cam adjacent to the first follower, the arm engageable with the second follower to move the second follower along the second two-dimensional profile of the arm as the z-axis load of the first extruder is supported on the arm.

15. The extruder assembly of claim 14, wherein the damper includes a contact surface for the second follower, the contact surface shaped to lower the first extruder into a working position along the z-axis as the first extruder moves away from the support along the x-axis or y-axis.

16. The extruder assembly of claim 14, wherein the first follower is movable along the working surface of the linear cam in rolling contact with the working surface of the linear cam, and the second follower is movable along the damper in rolling contact with the support.

17. The extruder assembly of claim 14, wherein the first follower and the second follower are spaced apart from one another at least along the z-axis.

18. The extruder assembly of claim 14, wherein at least one of the damper or the support is in a fixed location along the axis perpendicular to the z-axis.

19. The extruder assembly of claim 14, further comprising a second extruder supported on the carriage, wherein the second extruder defines a second extrusion path, and movement of the first follower along the working surface of the linear cam changes a z-axis position of the first extruder.

20. The extruder assembly of claim 14, wherein the working surface of the linear cam is movable relative to the first extruder along the axis perpendicular to the z-axis.

21. The extruder assembly of claim 14, wherein the first two-dimensional profile of the working surface of the linear cam is different from the second two-dimensional profile of the arm.

* * * * *